(12) United States Patent
Shiraishi et al.

(10) Patent No.: US 8,269,852 B2
(45) Date of Patent: Sep. 18, 2012

(54) IMAGING APPARATUS AND IMAGING METHOD

(75) Inventors: Kenji Shiraishi, Yokohama (JP); Manabu Yamada, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 374 days.

(21) Appl. No.: 12/667,974

(22) PCT Filed: Sep. 12, 2008

(86) PCT No.: PCT/JP2008/066916
§ 371 (c)(1),
(2), (4) Date: Jan. 6, 2010

(87) PCT Pub. No.: WO2009/035148
PCT Pub. Date: Mar. 19, 2009

(65) Prior Publication Data
US 2011/0001841 A1     Jan. 6, 2011

(30) Foreign Application Priority Data

Sep. 14, 2007  (JP) .................................. 2007-240038
Nov. 6, 2007   (JP) .................................. 2007-288714
Jun. 25, 2008  (JP) .................................. 2008-165908

(51) Int. Cl.
H04N 5/228   (2006.01)
H04N 5/235   (2006.01)
H04N 3/14    (2006.01)
H04N 9/73    (2006.01)

(52) U.S. Cl. ..................................... 348/222.1; 348/272
(58) Field of Classification Search ............... 348/221.1, 348/222.1, 223.1, 229.1, 256, 272, 273, 280, 348/234, 252, 255
See application file for complete search history.

(56) References Cited

U.S. PATENT DOCUMENTS

| | | | |
|---|---|---|---|
| 6,809,761 B1 * | 10/2004 | Tamaru | 348/229.1 |
| 7,019,274 B2 | 3/2006 | Yamada | |
| 7,098,946 B1 | 8/2006 | Koseki et al. | |
| 7,301,579 B2 | 11/2007 | Shinohara et al. | |
| 7,324,150 B2 | 1/2008 | Shiraishi | |
| 7,397,502 B2 | 7/2008 | Shiraishi | |
| 7,471,321 B2 | 12/2008 | Ojima et al. | |
| 7,573,509 B2 | 8/2009 | Shiraishi | |
| 7,589,782 B2 | 9/2009 | Shiraishi et al. | |
| 7,598,997 B2 | 10/2009 | Shiraishi | |

(Continued)

FOREIGN PATENT DOCUMENTS

JP       10-262182 A     9/1998

(Continued)

*Primary Examiner* — Jason Whipkey
*Assistant Examiner* — Marly Camargo
(74) *Attorney, Agent, or Firm* — Dickstein Shapiro LLP

(57) ABSTRACT

An imaging apparatus and an imaging method which can obtain an image in which a dynamic range is expanded at one shooting are provided. In a case where a pixel output of a pixel where a specific color separation filter is placed is equal to or more than a predetermined saturation level, based on a pixel output of a pixel which is placed in the vicinity of the pixel where the specific color separation filter is placed, a pixel output for brightness, where the pixel output becomes equal to or more than the predetermined saturation level, of the pixel where the color separation filter of the specific color is placed and the pixel output is equal to or more than the predetermined saturation level is compensated, and thereby a dynamic range of an image sensor is expanded.

19 Claims, 24 Drawing Sheets

U.S. PATENT DOCUMENTS

| | | | |
|---|---|---|---|
| 7,884,866 B2 * | 2/2011 | Yamada et al. | 348/280 |
| 8,081,242 B2 * | 12/2011 | Shiraishi | 348/256 |
| 8,144,216 B2 * | 3/2012 | Shiraishi | 348/229.1 |
| 2005/0062854 A1 | 3/2005 | Shiraishi | |
| 2005/0134700 A1 | 6/2005 | Shiraishi | |
| 2005/0151874 A1 | 7/2005 | Shiraishi | |
| 2006/0192878 A1 * | 8/2006 | Miyahara et al. | 348/333.01 |
| 2007/0216951 A1 | 9/2007 | Shiraishi | |
| 2007/0263933 A1 | 11/2007 | Ojima et al. | |
| 2007/0268370 A1 | 11/2007 | Sanno et al. | |
| 2008/0036901 A1 | 2/2008 | Shinohara et al. | |
| 2008/0297633 A1 * | 12/2008 | Wada | 348/272 |

FOREIGN PATENT DOCUMENTS

| | | |
|---|---|---|
| JP | 2000-92378 A | 3/2000 |
| JP | 2000-316163 A | 11/2000 |
| JP | 2001-112010 A | 4/2001 |
| JP | 2002-92607 A | 3/2002 |
| JP | 2002-281361 A | 9/2002 |
| JP | 2003-199117 A | 7/2003 |
| JP | 2004-193762 A | 7/2004 |
| JP | 2004-328564 A | 11/2004 |
| JP | 2006-180270 A | 7/2006 |
| JP | 2008-22521 A | 1/2008 |
| WO | WO-2007/145373 A2 | 12/2007 |

* cited by examiner (a)

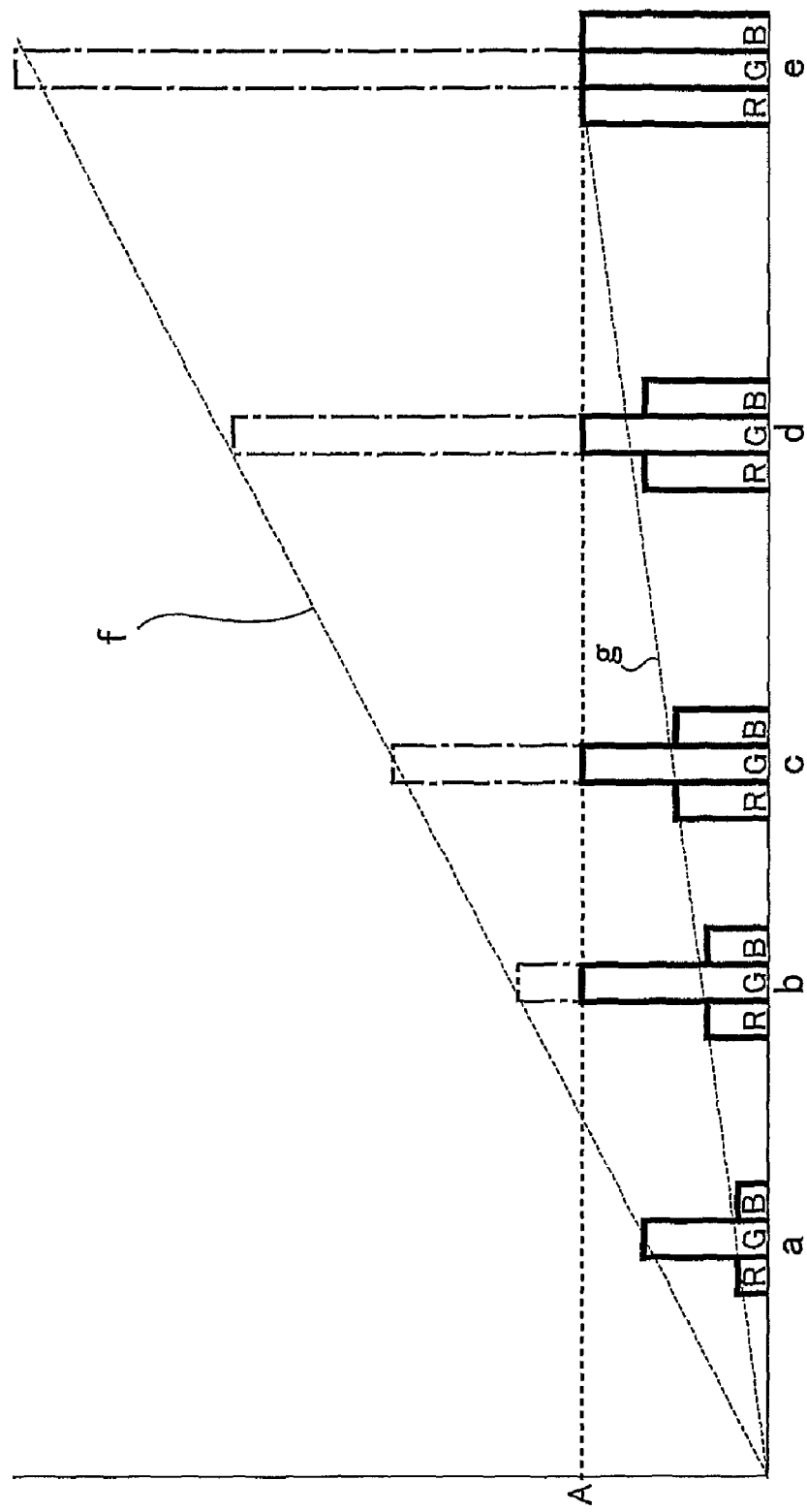

IMAGING APPARATUS AND IMAGING METHOD

TECHNICAL FIELD

The present invention relates to an imaging apparatus such as a digital still camera, a digital video camera, and the like, and to an imaging method. Especially, the present invention relates to an imaging apparatus which has a function of being capable of expanding a dynamic range of an image to be imaged, and to an imaging method therefor.

BACKGROUND ART

A dynamic range of an image shot by a digital still camera, a digital video camera, and the like having a solid-state image sensor such as a CCD and so on is far narrower than a dynamic range of an image shot by a traditional silver-halide camera using a silver-halide photography film. In a case where the dynamic range is narrow, "an underexposure" occurs in a dark area of a photographic subject and "an overexposure" occurs in a bright area of the photographic subject, and thereby an image quality is degraded.

In order to expand the dynamic range of the image shot by the solid-state image sensor such as the CCD and so on, for example, Japanese patent publication No. 2000-92378 discloses a technique in which a plurality of shootings is performed with different exposure amounts on the same photographic subject, a plurality of different exposure-amount images is obtained, and then these images are put together to produce a composite image with an expanded dynamic range.

DISCLOSURE OF THE INVENTION

In a case where a method of compositing a plurality of images shot with different exposure amounts disclosed in Japanese patent publication No. 2000-92378 is used in order to expand the dynamic range, there is a problem that a displacement of a photographic subject in a plurality of shot images occurs and images are not accurately composited if the photographic subject moves when shooting.

An object of the present invention is to provide an imaging apparatus which is capable of obtaining an image in which a dynamic range is expanded at one shooting, and to provide an imaging method therefor.

An imaging apparatus according to embodiments of the present invention comprises: an image sensor having a light receiving surface including a plurality of pixels and a color separation filter of a plurality of colors which is placed on a front surface side of the plurality of pixels, which receives a photographic subject image which enters via an optical system on the light receiving surface via the color separation filter, outputs an pixel output of each pixel, and images the photographic subject image; a pixel output judging section which judges if the pixel output is equal to or more than a predetermined saturation level or not; and a pixel output compensation processing section which, in a case where the pixel output of the pixel where a color separation filter of a specific color is placed is judged to be equal to or more than the predetermined saturation level by the pixel output judging section, based on the pixel output of other pixels where the pixel output is less than the predetermined saturation level placed in the vicinity of the pixel where the color separation filter of the specific color is placed and the pixel output is equal to or more than the predetermined saturation level, performs a compensation process to calculate the pixel output for brightness, where the pixel output becomes equal to or more than the predetermined saturation level, of the pixel where the color separation filter of the specific color is placed and the pixel output is equal to or more than the predetermined saturation level, and expands a dynamic range of the image which the image sensor images.

Preferably, the pixel output compensation processing section, in a case where the pixel output of the pixel where a color separation filter of a specific color is placed is judged to be equal to or more than the predetermined saturation level by the pixel output judging section, based on a pixel output of a pixel where a different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

Preferably, the pixel output compensation processing section, in a case where the pixel output of the pixel where the color separation filter of the specific color is placed is judged to be equal to or more than the predetermined saturation level by the pixel output judging section, based on the pixel output of the pixel where a same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

Preferably, the pixel output compensation processing section comprises: a first pixel output compensation processing section which, in a case where the pixel output of the pixel where the color separation filter of the specific color is placed is judged to be equal to or more than the predetermined saturation level by the pixel output judging section, based on the pixel output of the pixel where the different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level; and a second pixel output compensation processing section which, in a case where the pixel output of the pixel where the color separation filter of the specific color is placed is judged to be equal to or more than the predetermined saturation level by the pixel output judging section, based on the pixel output of the pixel where the same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and the pixel output compensation processing section, based on compensation values which are outputted respectively from the first pixel output compensation processing section and the second pixel output compensation processing section, properly sets the pixel output for brightness which is equal to or more than the saturation level of the pixel where the color separation filter of the specific color is placed and the pixel output is equal to or more than the predetermined saturation level, and expands the dynamic range of the image which the image sensor images.

Preferably, a processing unit, in the case of judging the pixel output by the pixel output judging section, is an area comprising two pixels each in a horizontal and a vertical direction.

Preferably, on an optical axis of the optical system, a color filter having a same color as the color separation filter of the specific color is provided as it is placed freely, and the color filter is placed on the optical axis of the optical system, and thereby a sensitivity of another color separation filter is relatively reduced, compared with a sensitivity of the color separation filter of the specific color.

Preferably, a plurality of the color filters is provided and each of the color filters has a different light transmission rate.

Preferably, the imaging apparatus further comprises: a dynamic range expansion rate setting section which sets the dynamic range expansion rate; an expansion rate changing and controlling section which changes and controls the dynamic range expansion rate in the pixel output compensation processing section, based on the dynamic range expansion rate set by the dynamic range expansion rate setting section; and a histogram producing section which produces a histogram by calculating a frequency of an occurrence of the pixel output at each brightness in a predetermined brightness range, and the expansion rate changing and controlling section, in a case where the pixel output of the pixel where a color separation filter of a specific color is placed is judged to be equal to or more than the predetermined saturation level by the pixel output judging section, integrates the frequency of the occurrence of the pixel, from a maximum high brightness side toward a low brightness side in the histogram which is produced in the histogram producing section, and changes and controls the dynamic range expansion rate such that brightness where the integrated value becomes a prescribed value which is set beforehand becomes a new maximum high brightness of the histogram.

Preferably, the imaging apparatus further comprises: a dynamic range expansion rate setting section which sets the dynamic range expansion rate; an expansion rate changing and controlling section which changes and controls the dynamic range expansion rate in the pixel output compensation processing section, based on the dynamic range expansion rate set by the dynamic range expansion rate setting section; and a histogram producing section which produces a histogram by calculating a frequency of an occurrence of the pixel output at each brightness in a predetermined brightness range, and the expansion rate changing and controlling section, in a case where the pixel output of the pixel where a color separation filter of a specific color is placed is judged to be equal to or more than the predetermined saturation level by the pixel output judging section, integrates the frequency of the occurrence of the pixel, from a low brightness side toward a maximum high brightness side in the histogram which is produced in the histogram producing section, and changes and controls the dynamic range expansion rate such that brightness where the integrated value becomes a prescribed value which is set beforehand becomes a new maximum high brightness of the histogram.

Preferably, the imaging apparatus further comprises: a dynamic range expansion rate setting section which sets the dynamic range expansion rate; and an expansion rate changing and controlling section which changes and controls the dynamic range expansion rate in the pixel output compensation processing section, based on the dynamic range expansion rate set by the dynamic range expansion rate setting section, and the expansion rate changing and controlling section, with the dynamic range expansion, changes and controls the dynamic range expansion rate by multiplying the pixel output which is less than the predetermined saturation level by a predetermined coefficient.

Preferably, the imaging apparatus further comprises: a bit compression converting section having a bit compression conversion characteristic where a data compression rate of the pixel output for brightness which is less than the saturation level is smaller than a data compression rate of the pixel output for brightness which is equal to or more than the saturation level, with the dynamic range expansion, and which reconverts data of the pixel output converted from a first bit number to a second bit number which is larger than the first bit number to the first bit number based on the bit compression conversion characteristic.

Preferably, the bit compression conversion characteristic, in a case where the brightness is less than the predetermined saturation level and low-level, has a compression rate such that data of the pixel output before converting and data of the pixel output after converting become almost a same value.

Preferably, the pixel output compensation processing section, only in a case where the pixel output which is calculated when performing the compensation process becomes larger than a pixel output being a compensation process object, performs the compensation process.

Preferably the pixel output compensation processing section, in a case where the pixel output which is calculated when performing the compensation process becomes smaller than a pixel output being a compensation process object, expands a distribution range of the pixel which is used for a calculation of the pixel output described above.

Preferably, the pixel output compensation processing section, in the case of expanding the distribution range of the pixel, also uses the pixel where the color separation filter of the specific color is placed and the pixel output is less than the saturation level.

An imaging method of an imaging apparatus having an image sensor having a light receiving surface including a plurality of pixels and a color separation filter of a plurality of colors which is placed on a front surface side of the plurality of pixels, which receives a photographic subject image which enters via an optical system on the light receiving surface via the color separation filter, outputs an pixel output of each pixel, and images the photographic subject image, the imaging method according to embodiments of the present invention comprising: a pixel output judging step of judging if the pixel output is equal to or more than a predetermined saturation level or not; and a pixel output compensation processing step of, in a case where the pixel output of the pixel where a color separation filter of a specific color is placed is judged to be equal to or more than the predetermined saturation level by the pixel output judging step, based on the pixel output of other pixels where the pixel output is less than the predetermined saturation level placed in the vicinity of the pixel where the color separation filter of the specific color is placed and the pixel output is equal to or more than the predetermined saturation level, performing a compensation process to calculate the pixel output for brightness, where the pixel output becomes equal to or more than the predetermined saturation level, of the pixel where the color separation filter of the specific color is placed and the pixel output is equal to or more than the predetermined saturation level, and expanding a dynamic range of the image which the image sensor images.

Preferably, the pixel output compensation processing step, in a case where the pixel output of the pixel where a color separation filter of a specific color is placed is judged to be equal to or more than the predetermined saturation level by the pixel output judging step, based on a pixel output of a pixel where a different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

Preferably, the pixel output compensation processing step, in a case where the pixel output of the pixel where a color separation filter of a specific color is placed is judged to be equal to or more than the predetermined saturation level by the pixel output judging step, based on the pixel output of the pixel where a same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

Preferably, the pixel output compensation processing step comprises: a first pixel output compensation processing step of, in a case where the pixel output of the pixel where a color separation filter of a specific color is placed is judged to be equal to or more than the predetermined saturation level by the pixel output judging step, based on the pixel output of the pixel where the different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performing the compensation process to calculate the pixel output for brightness, where the pixel output becomes equal to or more than the predetermined saturation level, of the pixel where the color separation filter of the specific color is placed and the pixel output is equal to or more than the predetermined saturation level; and a second pixel output compensation processing step of, in a case where the pixel output of the pixel where a color separation filter of a specific color is placed is judged to be equal to or more than the predetermined saturation level by the pixel output judging step, based on the pixel output of the pixel where the same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performing the compensation process to calculate the pixel output for brightness, where the pixel output becomes equal to or more than the predetermined saturation level, of the pixel where the color separation filter of the specific color is placed and the pixel output is equal to or more than the predetermined saturation level, and the pixel output compensation processing step, based on compensation values which are outputted respectively from the first pixel output compensation processing step and the second pixel output compensation processing step, properly sets the pixel output for brightness which is equal to or more than the saturation level of the pixel where the color separation filter of the specific color is placed and the pixel output is equal to or more than the predetermined saturation level, and expands the dynamic range of the image which the image sensor images.

Preferably, a processing unit, in the case of judging the pixel output by the pixel output judging step, is an area comprising two pixels each in a horizontal and a vertical direction.

BRIEF DESCRIPTION OF THE DRAWINGS

The accompanying drawings are included to provide a further understanding of the invention, and are incorporated in and constitute a part of this description. The drawings illustrate embodiments of the invention and together with the description, serve to explain the principle of the invention.

FIG. 16 illustrates a state of a pixel placement of a CCD having an RGB filter and a processing unit where a dynamic range expanding process is performed in the digital camera according to an embodiment 3 of the present invention.

FIG. 17 illustrates a state of a pixel placement of a CCD having an RGB filter and a processing unit where a dynamic range expanding process is performed in the digital camera according to an embodiment 4 of the present invention.

FIG. 25 is an explanatory view of a principle of a dynamic range expansion of an image sensor according to the embodiment 8 of the present invention.

Figure 1A:
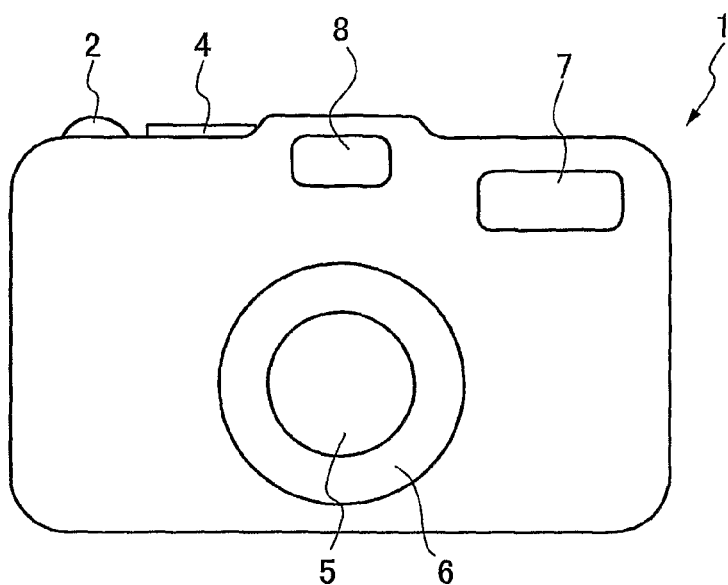
FIG. 1A illustrates a front view of a digital camera according to embodiments 1 to 9 of the present invention.

DESCRIPTION OF NUMERALS 1 digital camera (imaging apparatus)
5 photographing lens system (optical system)
6 lens barrel unit
9 liquid crystal display (LCD) monitor
12 menu button (dynamic range expansion rate setting section)
20 CCD (image sensor)
21 analog front end section
22 signal processing section
23 SDRAM
28 controlling section (expansion rate changing and controlling section)
34 CCD interface
35 memory controller
36 YUV converting section
36a YUV converting section
50 dynamic range expansion compensating section 51 bit compressing section
57 brightness histogram producing section
60 brightness level judging section (pixel output detecting section)
61 pixel output compensation processing section
61a pixel output compensation processing section
62 bit extension processing section
63 first pixel output compensation processing section
64 second pixel output compensation processing section
65 compensation data compositing section (compensation processing section)
70a first green color filter (color filter)
70b second green color filter (color filter)
72 turret plate

BEST MODE FOR CARRYING OUT THE INVENTION

Figure 1B:
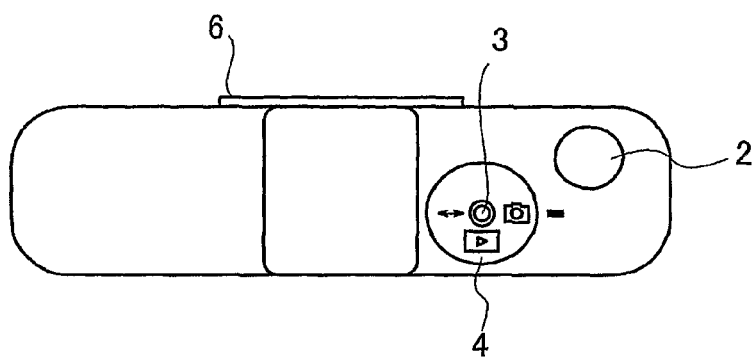
FIG. 1B illustrates a top view of the digital camera according to the embodiments 1 to 9 of the present invention.
Figure 1C:
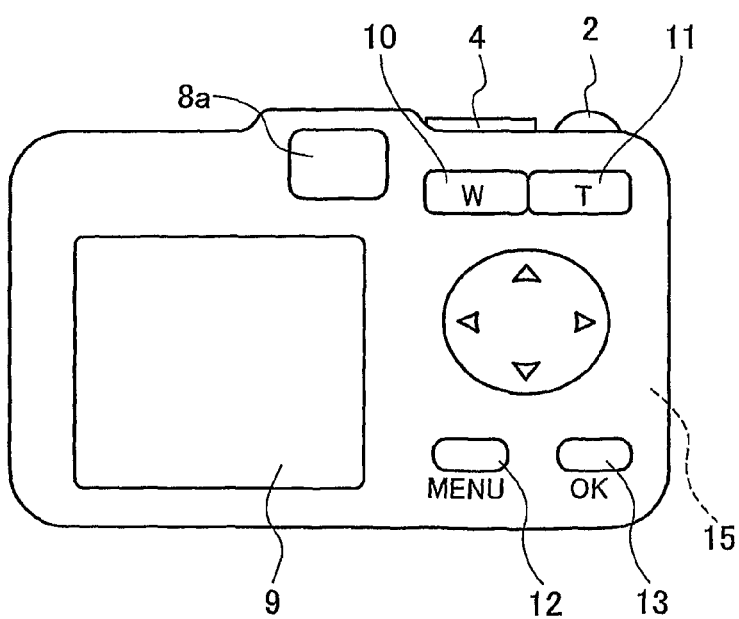
FIG. 1C illustrates a back view of the digital camera according to the embodiments 1 to 9 of the present invention.
Figure 2:
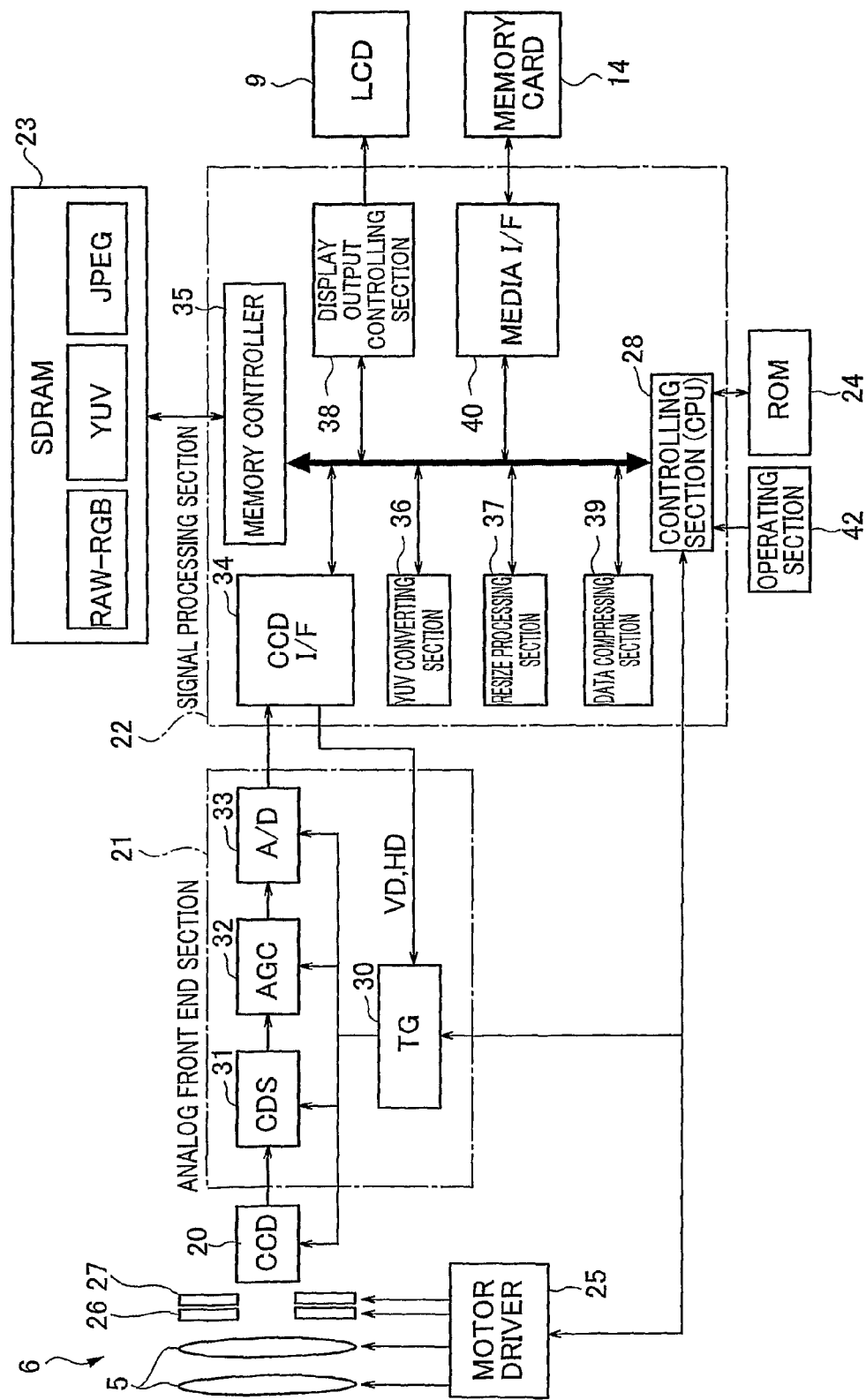
FIG. 2 illustrates a block diagram of a system of the digital camera according to the embodiments 1 to 9 of the present invention.

Hereinafter, with reference to the drawings, embodiments of the present invention will be explained.
[Embodiment 1]
FIG. 1A is a front view, FIG. 1B is a top view, and FIG. 1C is a back view of a digital still camera (hereinafter, it is called a "digital camera") as an example of an imaging apparatus according to an embodiment of the present invention. FIG. 2 is a schematic block diagram illustrating a system structure inside of the digital camera illustrated in FIGS. 1A to 1C.
[External Appearance Structure of the Digital Camera]
As illustrated in FIGS. 1A to 1C, on a top side of the digital camera 1 according to the present embodiment, a release button (shutter button) 2, a power button 3, and a mode (shooting mode/playback mode) switching dial 4 are provided. On a front side of the digital camera 1, a lens barrel unit 6 having a photographing lens system 5, a stroboscopic light emitting section 7, and an optical viewfinder 8 are provided.
On a back side of the digital camera 1, a liquid crystal display (LCD) monitor 9, an eyepiece lens section 8a of the optical viewfinder 8, a wide angle side zoom (W) button 10, a telephoto angle side zoom (T) button 11, a menu (MENU) button 12, a confirmation (OK) button 13 and so on are provided. Additionally, inside a side of the digital camera 1, a memory card storing section 15 is provided. The memory card storing section 15 stores a memory card 14 (see FIG. 2) which saves shot image data.
[System Structure of the Digital Camera]
As illustrated in FIG. 2, provided inside this digital camera 1 are a CCD (Charge-Coupled Device) 20, which is a solid-state image sensor where an image of a photographic subject enters via the photographing lens system 5 placed in the lens barrel unit 6 and forms an image on a light-receiving surface, an analog front end section 21 (hereinafter, it is called an "AFE section.") which converts an electric signal outputted from the CCD 20 (an analog ROB image signal) into a digital signal, a signal processing section 22 which processes a digital signal outputted from the AFE section 21, a SDRAM (Synchronous Dynamic Random Access Memory) 23 which temporarily stores data, a ROM (Read Only Memory) 24 in which a control program and so on are stored, a motor driver 25 and so on.
The lens barrel unit 6 comprises the photographing lens system 5 having a zoom lens, a focus lens and so on, an aperture unit 26, and a mechanical shutter unit 27, and each driver unit (not illustrated) of the photographing lens system 5, the aperture unit 26, and the mechanical shutter unit 27 is driven by the motor driver 25. The motor driver 25 is driven and controlled by a driving signal from a controlling section (CPU, Central Processing Unit) 28 of the signal processing section 22.

The CCD 20 comprises a plurality of pixels, where an RGB primary-color filter (see FIG. 7: hereinafter, it is called an "RGB filter.") as a color separation filter is placed, and outputs the electric signal (the analog RGB image signal) corresponding to RGB, three primary colors.

The AFE section 21 comprises a TG (a timing signal generating section) 30 which drives the CCD 20, a CDS (a correlated double sampling section) 31 which samples the electric signal (the analog ROB image signal) outputted from the CCD 20, an AGC (an analog gain controlling section) 32 which adjusts a gain of the electric signal (the analog RGB image signal) sampled in the CDS 31, and an A/D converting section (an analog/digital converting section) 33 which converts the electric signal (the analog RGB image signal) gain-adjusted in the AGC 32 into a digital signal (hereinafter, it is called an "RAW-RGB data").

The signal processing section 22 comprises a CCD interface (hereinafter, it is called a "CCD I/F") 34 which outputs a picture horizontal synchronizing signal (HD) and a picture vertical synchronizing signal (VD) to the TG 30 of the AFE section 21 and loads the RAW-ROB data outputted from the A/D converting section 33 of the AFE section 21 synchronizing with these synchronizing signals, a memory controller 35 which controls the SDRAM 23, a YUV converting section 36 which converts the loaded RAW-RGB data into image data in YUV format which is displayable and recordable, a resize processing section 37 which changes a size of an image corresponding to the size of the image data which is displayed or recorded, a display output controlling section 38 which controls a display output of the image data, a data compressing section 39 which records the image data in JPEG format and so on, a media interface (hereinafter, it is called a "media I/F") 40 which writes the image data in the memory card 14 or reads out the image data written in the memory card 14, and the controlling section (CPU) 28 which performs a whole system control of the digital camera 1 and so on based on the control program kept in the ROM 24 by operating information inputted from an operating section 41.

The operating section 41 comprises the release button 2, the power button 3, the mode switching dial 4, the wide angle side zoom button 10, the telephoto side zoom button 11, the menu (MENU) button 12, the confirmation (OK) button 13 and the like on an external surface of the digital camera 1 (see FIGS. 1A, 1B, and 1C), and a predetermined operation indicating signal is inputted to the controlling section 28 by an operation of a user.

In the SDRAM 23, the RAW-RGB data loaded in the CCD OF 34 is stored. YUV data converted in the YUV converting section 36 is also stored in the SDRAM 23. Additionally, image data in JPEG format which is compressed in the data compressing section 39 and so on are stored is the SDRAM 23.

The YUV data is in a format such that colors are represented by information of brightness data (Y) and color differences (U, which is a color difference between brightness data (Y) and blue (B) component data and V, which is a color difference between brightness data (Y) and red (R) component data).
[Monitoring Process and Still Image Shooting Process of the Digital Camera 1]
Next, a monitoring process and a still image shooting process of the digital camera 1 will be explained. In a still image shooting mode, the digital camera 1 performs the still image shooting process while the monitoring process as explained below is performed.

Firstly, the power button 3 is turned on, the mode switching dial 4 is set to a shooting mode (still image shooting mode), and then operation of the digital camera 1 is started in the shooting mode. When the controlling section 28 detects that the power button 3 is turned on and the mode switching dial 4 is set to the shooting mode, the controlling section 28 outputs a control signal to the motor driver 25 to move the lens barrel unit 6 to a standby shooting position and to start operating the CCD 20, the AFE section 21, the signal processing section 22, the SDRAM 23, the ROM 24, the LCD monitor 9 and the like.

In this state, when the photographing lens system 5 of the lens barrel unit 6 is aimed at a photographic subject, an image of the photographic subject is formed on the light receiving surface of the CCD 20 via the photographing lens system 5. And an electric signal (an analog RGB image signal) corresponding to the image of the photographic subject outputted from the CCD 20 (an analog RGB image signal) is outputted to the A/D converting section 33 via the CDS 31 and the AGC 32, and then the electric signal is converted into 12-bit RAW-RGB data by the A/D converting section 33.

This RAW-RGB data, after being loaded in the CCD I/F 34 of the signal processing section 22, is loaded in the SDRAM 23 via the memory controller 35, and then stored in the SDRAM 23. The RAW-ROB data read out from the SDRAM 23 is outputted to the YUV converting section 36, and is converted into YUV data which is a displayable format. This YUV data is loaded in the SDRAM 23 via the memory controller 35 and is stored in the SDRAM 23.

The YUV data read out from the SDRAM 23 via the memory controller 35 is outputted to the liquid crystal display monitor (LCD) 9 via the display output controlling section 38, and a shooting image (moving image) is displayed. A monitoring process involves the shooting image being displayed on this liquid crystal display monitor (LCD) 9. When the monitoring process is performed, image data of the photographic subject for one frame is read out at 1/30 second (i.e. 30 fps) by the CCD I/F 34.

While this monitoring process is performed, the shooting image (moving image) is only displayed on the liquid crystal display monitor (LCD) 9 functioned as an electric viewfinder, and it is in a state such that the release button 2 is not pressed (half-pressed and fully-pressed) yet.

A photographic subject image is displayed on the liquid crystal display monitor (LCD) 9 by this monitoring process, and it is possible for the user to check a composition of the shooting image. In addition, the display output controlling section 38 outputs the photographic subject image as a video signal, and the photographic subject image is displayed on an external display via a video cable.

The CCD I/F 34 of the signal processing section 22 calculates an AF (Auto Focus) evaluation value, an AE (Auto Exposure) evaluation value, and AWB (Auto White Balance) evaluation value based on the RAW-RGB data.

The AF evaluation value is calculated based on, for example, an output integral value of a high frequency component extraction filter and an integral value of brightness difference between adjacent pixels. Generally, in a focusing state, an edge part of the photographic subject is clear, therefore more of the high frequency component is included compared to in a non-focusing state. That is, in the focusing state, the output integral value of the high frequency component extraction filter becomes large, compared to in the non-focusing state. Therefore, the output integral value of the high frequency component extraction filter is taken as the AF evaluation value, and when the AF process is performed (when the focusing detection process is performed), a maximum value among the AF evaluation values obtained in each position of focus lenses of the photographing lens system 5 is taken as a focusing position.

The AE evaluation value and the AWB evaluation value are calculated on the basis of each integral value of the RGB value in the RAW-RGB data. For example, an image plane corresponding to the light receiving surface of entire pixels of the CCD 20 is equally divided into 256 segments (16 horizontal segments and 16 vertical segments), and an RGB integrated value of each segment is calculated.

The controlling section 28, in the AE process, on the basis of the calculated RGB integrated value, calculates brightness of each area of the image plane, and determines an appropriate exposure amount by a state of a distribution of the calculated brightness. In addition, on the basis of the determined exposure amount, an exposure condition (the number of releases of the electric shutter of the CCD 20, an aperture value of the aperture unit 26 and the like) is set.

The controlling section 28, in the AWB process, determines a control value of AWB corresponding to a color of a light source of the photographic subject by a state of a distribution of RGB. By this AWB process, a white balance in a case where the RAW-RGB data is converted into the YUV data in the YUV converting section 36 is adjusted. The AE process and the AWB process are continuously performed while the monitoring process is performed.

While the monitoring process is performed, when the release button 2 is pressed (from half-pressed to fully-pressed) and the still image shooting process is started, the AF process and a still image recording process are performed.

That is, when the release button 2 is pressed (from half-pressed to fully-pressed), a drive signal is outputted from the controlling section 28 to the motor driver 25, the focus lenses of the photographing lens system 5 are moved, and, for example, an AF process of a contrast evaluation system, which is a so-called "Hill-Climbing AF", is performed.

In a case where a focusing coverage is an entire area from infinity to the closest, the focus lenses of the photographing lens system 5 are moved to each focus position by a distance from the closest to infinity or the distance from infinity to the closest. The controlling section 28, on the basis of the AF evaluation values in each focus position calculated in the CCD I/F 34, determines a focus position where the AF evaluation value becomes maximum as a focusing position and moves the focus lenses to the focusing position.

Then the AE process described above is performed by the controlling section 28 and the appropriate exposure amount is determined. When completing an exposure, the controlling section 28 outputs a drive signal to the motor driver 25 to close the mechanical shutter unit 27. When the mechanical shutter unit 27 is closed, an analog RGB image signal for the still image is outputted from the CCD 20. And the analog image signal is converted into RAW-ROB data in the A/D converting section 33 of the AFE section 21.

This RAW-RGB data, after being loaded in the CCD I/F 34 of the signal processing section 22, is converted into YUV data in the YUV converting section 36. The YUV data is outputted to the SDRAM 23 via the memory controller 35 and is stored in the SDRAM 23. And this YUV data is read out from the SDRAM 23, and after being converted into a size corresponding to the number of recording pixels in the resize processing section 37, is then compressed into image data in JPEG format and so on in the data compressing section 39. The compressed image data in JPEG format and so on is stored in the SDRAM 23 again. The image data stored in the SDRAM 23 is read out from the SDRAM 23 via the memory controller 35, and then is outputted to the memory card 14 via the media I/F 41 and is stored in the memory card 14.

[Principle of Dynamic Range Expansion According to the Present Invention]

On each pixel of the CCD 20 of the digital camera 1, an RGB filter of Bayer Arrangement is placed. For each pixel, in terms of light which has a wide wavelength range such as sunlight, a sensitivity to brightness of each color is different.

Figure 3:
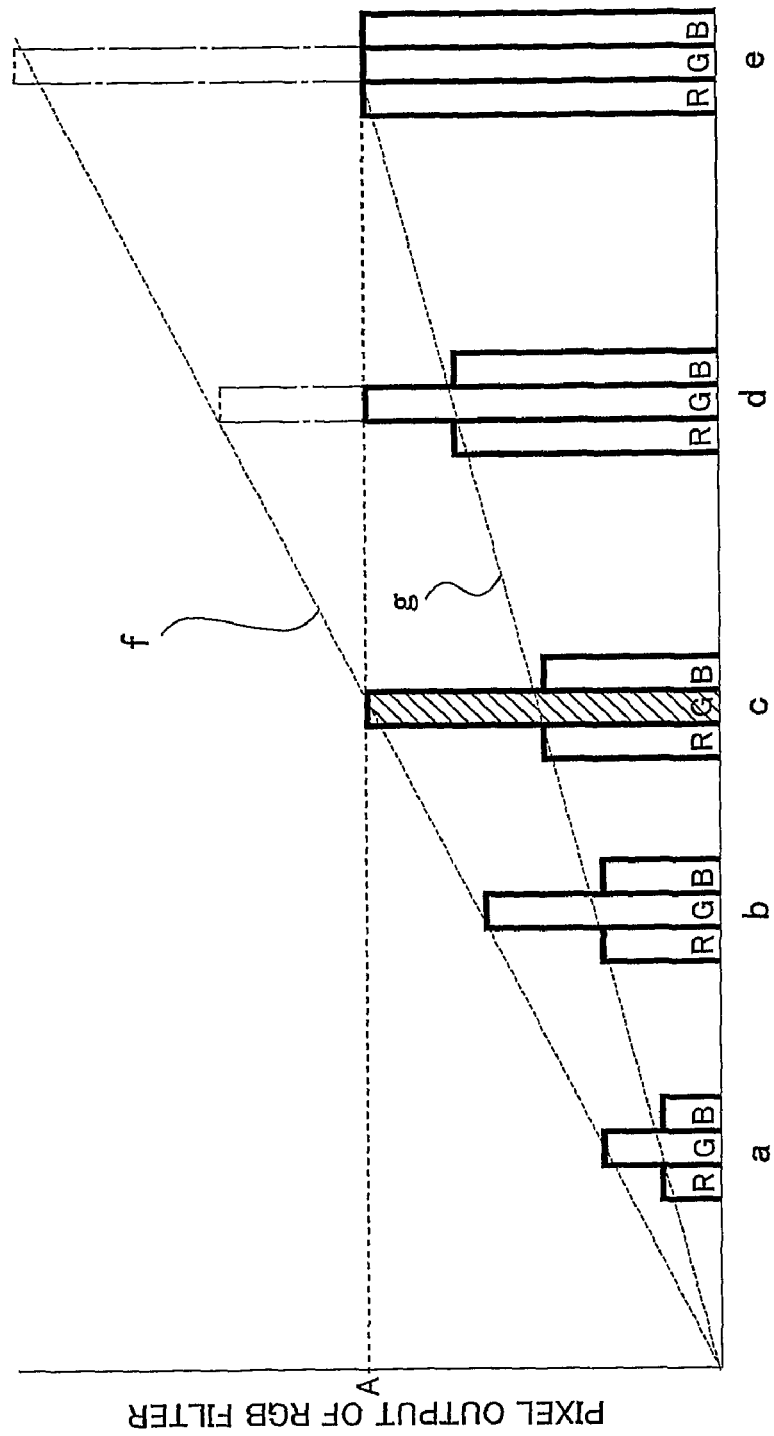
FIG. 3 illustrates an explanatory view of a principle of a dynamic range expansion of an image sensor according to an embodiment 1 of the present invention.

For example, as illustrated in FIG. 3, in a case where the CCD 20 where an RGB filter ("a", "b", and "c" in FIG. 3) is placed on each pixel in which a brightness sensitivity of a pixel where a G (green) filter is placed has approximately twice the brightness sensitivities of pixels where R (red) and B (blue) filters are placed, when light which has a wide wavelength range such as sunlight enters a pixel where the RGB filter is placed, a pixel output of the G filter (a shaded part of "c" in FIG. 3) reaches a saturation level A (a dashed line A) earlier, compared to each pixel output of the R and B filters. In FIG. 3, "f" illustrates a brightness sensitivity characteristic of a pixel where the G filter is placed, and "g" illustrates each brightness sensitivity characteristic of pixels where the R and B filters are placed, and the brightness sensitivity characteristic of the pixel where the G filter is placed has approximately a twofold sensitivity compared to each brightness sensitivity characteristic of the pixels where the R and B filters are placed.

Incidentally, in a digital camera including a solid-state image sensor (a CCD and the like) where a traditional RGB filter is placed on each pixel as illustrated by "c" in FIG. 3, a range of the dynamic range is set corresponding to the saturation level A of the pixel output (brightness sensitivity) of the pixel where the G filter having a high sensitivity is placed. Accordingly, in a case where the pixel output of the pixel where the G filter is placed is at the saturation level A, the pixel output of the pixels where the R and B filters are placed is approximately a half (½) of the saturation level A.

On the contrary, the digital camera 1 according to the present invention has the CCD in which the RGB filters as illustrated by "d" and "e" in FIG. 3 are placed on each pixel, in a case where the pixel output of the pixel where the G filter is placed is equal to or more than the saturation level A and each pixel output of the pixels where the R and B filters are placed is less than the saturation level A, on the basis of each brightness sensitivity characteristic of the pixels where the R and B filters are placed which is obtained from each pixel output of the pixels where the R and B filters are placed ("g" in FIG. 3) and the brightness sensitivity characteristic of the pixel where the G filter is placed which is obtained from a pixel output of the pixel where the G filter is placed ("f" in FIG. 3), a pixel output level of the pixel where the G filter is placed is compensated (dash-dotted line parts in FIG. 3) and the dynamic range is expanded corresponding to an amount which is compensated described above.

As described above, in the present embodiment, to light which has a wide wavelength range such as sunlight, the brightness sensitivity characteristic of the pixel where the G filter is placed has approximately twofold sensitivity compared to each brightness sensitivity characteristic of the pixels where the R and B filters are placed. Therefore, an expansion rate of the dynamic range of the present embodiment is approximately twofold at a maximum compared to when the dynamic range expanding process is not performed.

Additionally, in the present embodiment, the brightness sensitivity characteristic of the pixel where the G filter is placed has approximately twofold sensitivity compared to each brightness sensitivity characteristic of the pixels where the R and B filters are placed, and based on this, the expansion rate is approximately twofold at a maximum. However, by changing each brightness sensitivity characteristic of the pixels where the R, G and B filters are placed, the expansion rate of the dynamic range can be set to a desired value.

[The Dynamic Range Expanding Process by the YUV Converting Section 36]

The YUV converting section 36 of the digital camera 1 of the present embodiment, has a dynamic range expanding process function to expand the dynamic range described above.

Figure 4:
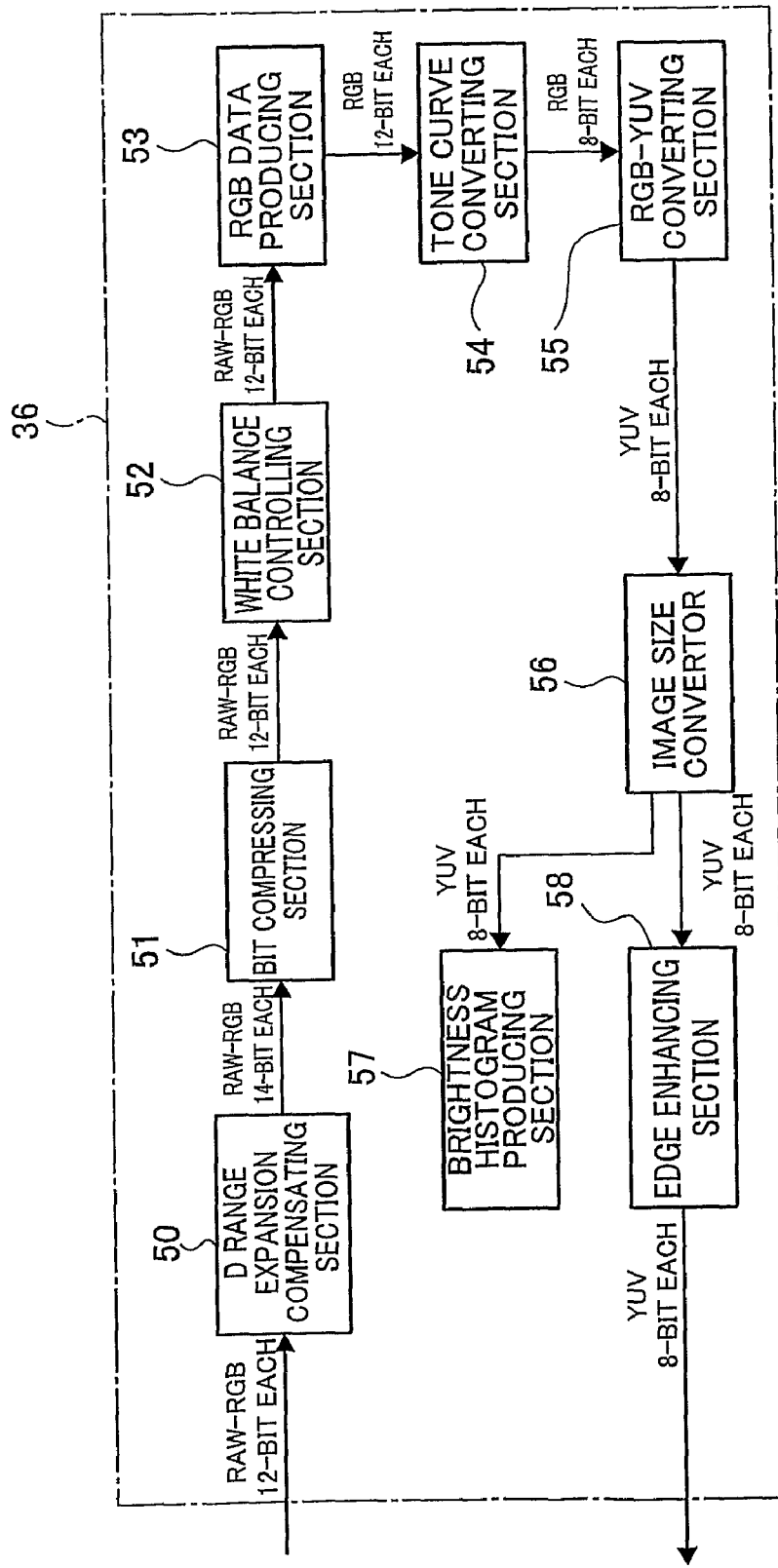
FIG. 4 illustrates a block diagram of a YUV converting section according to the embodiment 1 of the present invention.

The dynamic range expanding process is performed in the YUV converting section 36. As illustrated in FIG. 4, the YUV converting section 36 comprises a dynamic range expansion compensating section (D range expansion compensating section) 50 which is explained later, a bit compressing section 51, a white balance controlling section 52, an RGB producing section 53, a tone curve converting section 54, an RGB-YUV converting section 55, an image size convertor 56, a brightness histogram producing section 57, and an edge enhancing section 58.

Figure 5:
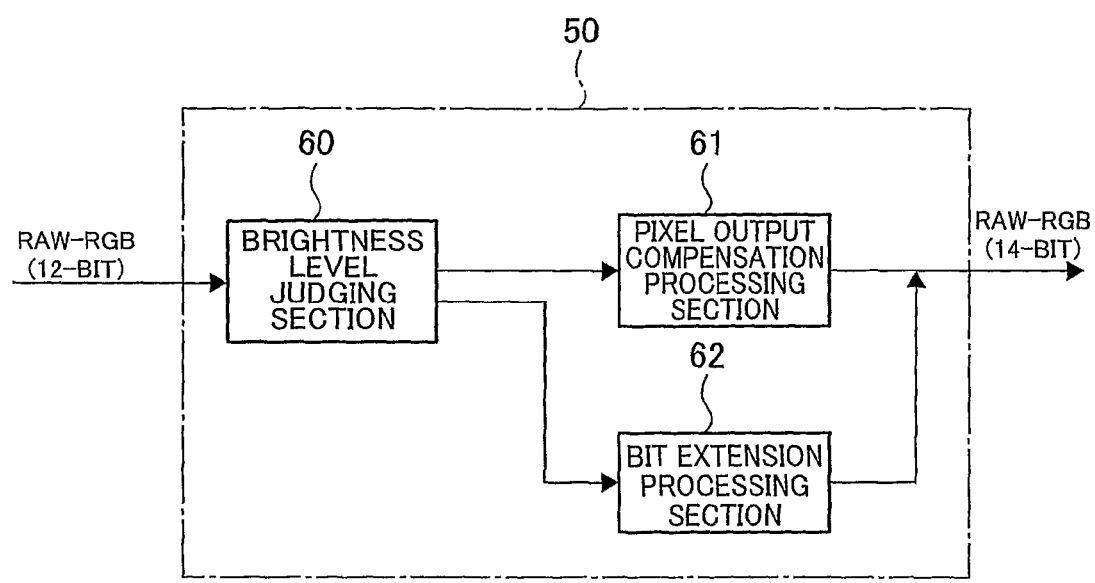
FIG. 5 illustrates a block diagram of a dynamic range expansion compensating section according to the embodiment 1 of the present invention.

As illustrated in FIG. 5, the dynamic range expansion compensating section 50 comprises a brightness level judging section 60, a pixel output compensation processing section 61, and a bit extension processing section 62. The brightness level judging section 60 detects a pixel output of each pixel provided with the RGB filter from an inputted RAW-RGB data, and judges if a pixel output of a pixel provided with the G filter having a highest sensitivity is equal to or more than a saturation level or not.

The brightness level judging section 60, in a case where the brightness level judging section 60 judges that the pixel output (hereinafter, it is called "the pixel output of the G filter") of the pixel where the G filter is placed in a processing unit which is described later is equal to or more than the saturation level, based on the pixel output (hereinafter, it is called "the pixel output of the R and B filters") of the pixel where the R and B filters are placed in the vicinity (the vicinity of the G filter where the pixel output is equal to or more than the saturation level), compensates the pixel output of the G filter which is equal to or more than the saturation level and performs a dynamic range expanding process (details will be explained later).

The bit extension processing section 62, in a case where the pixel output of the G filter is judged to be less than the saturation level in the brightness level judging section 60, performs a bit extension from 12-bit to 14-bit, without performing an output level conversion, on the pixel output of the G filter and the pixel output of the R and B filters.

Hereinafter, the dynamic range expanding process according to the present embodiment will be explained.

Figure 6A:
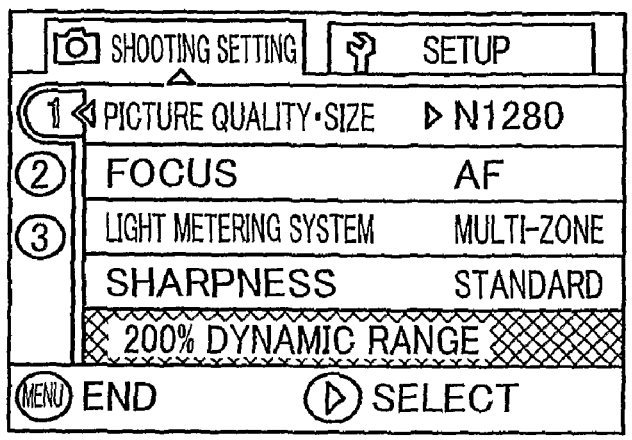
FIG. 6A illustrates an example of a shooting setting screen which is displayed on a liquid crystal display (LCD) monitor of the digital camera according to the embodiment 1 of the present invention.

For example, in a case where there is an extremely bright part in a background of a photographic subject which is desired to be shot and the dynamic range of an image sensor is desired to be expanded, for example, a shooting setting screen, as illustrated in FIG. 6A, is displayed on the liquid crystal display (LCD) monitor 9 by a user pressing a menu button 12 (see FIG. 1C) by.

As illustrated in FIG. 6A, pressing the menu button 12 allows selection of an item "200% dynamic range", and "200% dynamic range" is confirmed by pressing the confirmation button 13 (see FIG. 1C). And thereby, the dynamic range expanding process is turned on, and a control signal which doubles the expansion rate of the dynamic range is outputted from the controlling section 28 to the brightness level judging section 60. Thus, in the present embodiment, a pixel output judging section in claims is equivalent to the brightness level judging section 60, a pixel output compensation processing section in claims is equivalent to the pixel output compensation processing section 61, a dynamic range expansion rate setting section is equivalent to the menu button 12 and the controlling section 28, and an expansion rate changing and controlling section is equivalent to the controlling section 28.

Figure 6B:
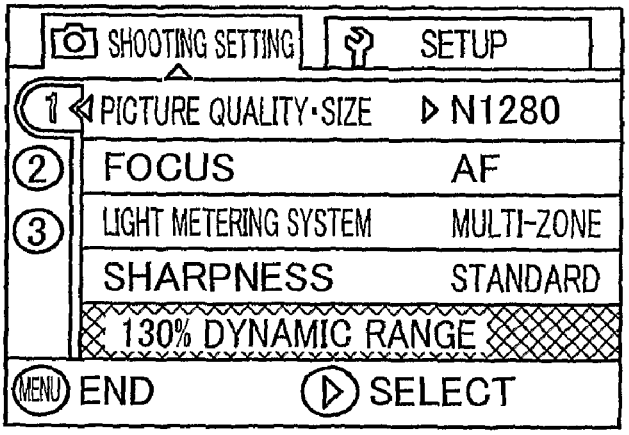
FIG. 6B illustrates another example of the shooting setting screen which is displayed on the liquid crystal display (LCD) monitor of the digital camera according to the embodiment 1 of the present invention.

An expansion rate of the dynamic range of the present embodiment can be arbitrarily set in a range of 110% to 200%, and the 200% described above is taken as a maximum value. In the present embodiment, the expansion rate of the dynamic range is set to be changeable, for example, 130% (4/3 times), 160% (5/3 times), and 200% by pressing the menu button 12. In a case where the expansion rate is set to be 130%, as illustrated in FIG. 6B, an item of "130% dynamic range" is selected from the shooting setting screen displayed on the liquid crystal display (LCD) monitor 9 by pressing the menu button 12, and "130% dynamic range" is confirmed by pressing the confirmation button 13.

Figure 6C:
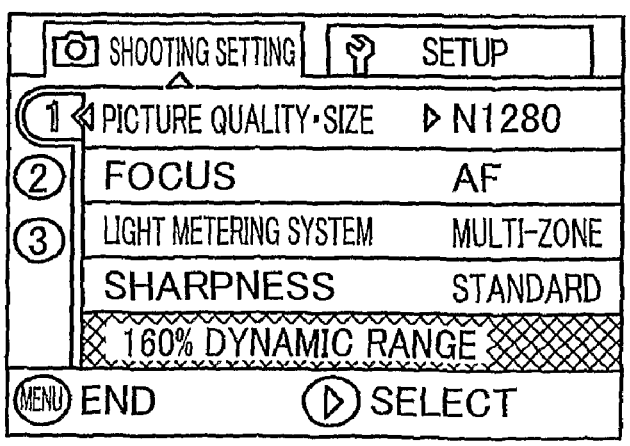
FIG. 6C illustrates still another example of the shooting setting screen which is displayed on the liquid crystal display (LCD) monitor of the digital camera according to the embodiment 1 of the present invention.

Likewise, in a case where the expansion rate of the dynamic expansion rate is set to be 160%, as illustrated in FIG. 6C, an item of "160% dynamic range" is selected from the shooting setting screen displayed on the liquid crystal display (LCD) monitor 9 by pressing the menu button 12, and "160% dynamic range" is confirmed by pressing the confirmation button 13.

The present embodiment is based on the premise that the pixel sensitivity characteristic of the G filter is approximately twice as high as the pixel sensitivity characteristic of the R and B filters, therefore in a case where a light source is extremely red or extremely blue, the pixel output of the G filter is not saturated and the pixel output of the R and/or B filters is often saturated. When the dynamic range expanding process is performed under this circumstance above, an accurate image tone and color reproduction are not obtained, therefore, in a case like this, a function of the dynamic range expansion is not used by a user's judgment.

Figure 7:
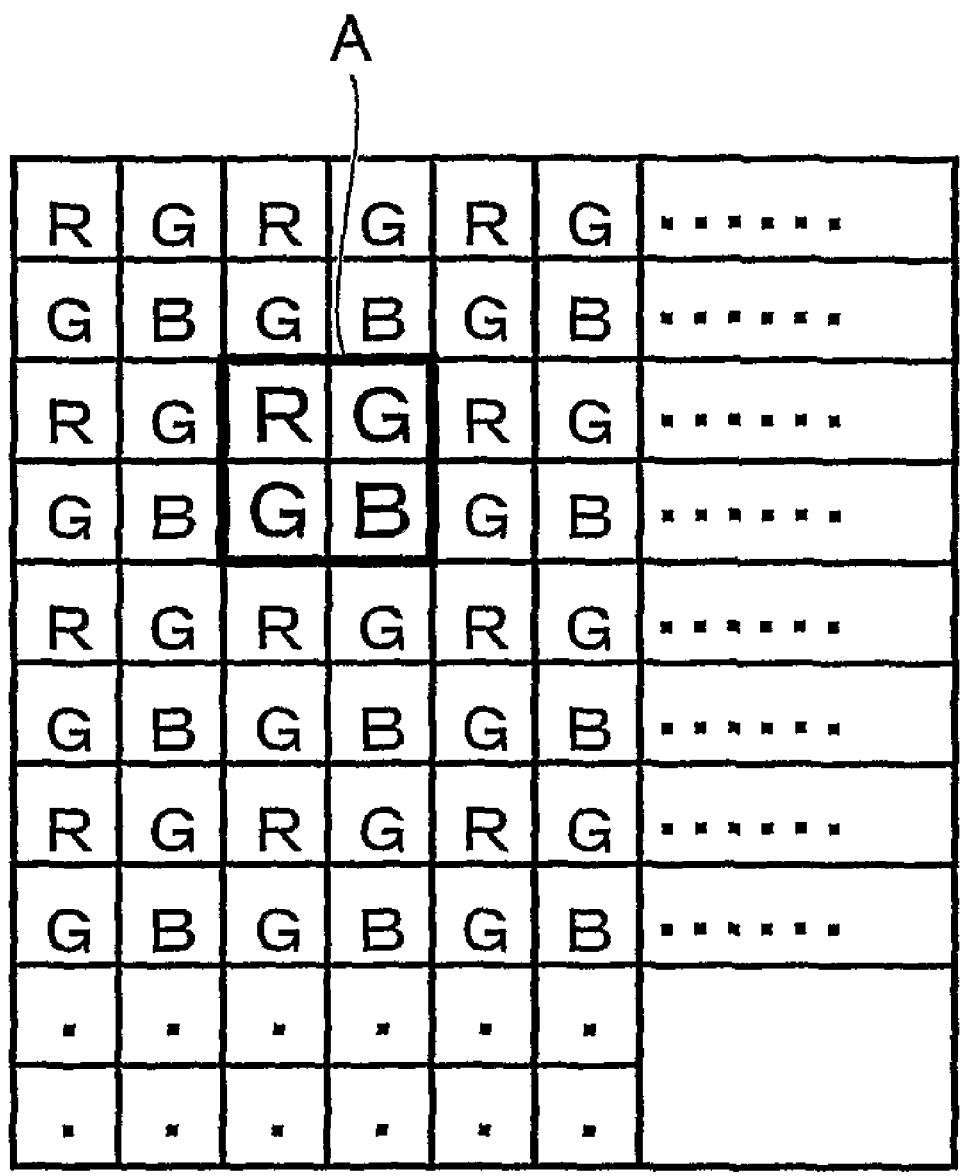
FIG. 7 illustrates a state of a pixel placement of a CCD having an RGB filter and a processing unit where a dynamic range expanding process is performed in the digital camera according to the embodiment 1 of the present invention.

When the controlling section 28 outputs a control signal to double the expansion rate of the dynamic range to the brightness level judging section 60 and the dynamic range expanding process is performed, the brightness level judging section 60 of the dynamic range expansion compensating section 50 judges if the pixel output of the G filter is equal to or more than the saturation level or not on the basis of inputted RAW-ROB data. In a case where a judging process above is performed, in the present embodiment, as illustrated in FIG. 7, two pixels where the G filter is set, a pixel where the R filter is set which is adjacent to the two pixels where the G filter is set, and a pixel where the B filter is set which is adjacent to the two pixels where the G filter is set of each pixel of the CCD 20 where the RGB filter is set, i.e. four pixels in total (2×2 pixels in a bold-line frame A), are taken as a processing unit (minimum unit). This pixel arrangement is generally called a "Bayer Arrangement".

In a case where at least one pixel output of the two pixels of the G filter in this processing unit (bold-line frame A) is equal to or more than the saturation level, the sensitivity of the G filter is approximately twice as high as the R and B filters as described above, therefore the pixel output of the G filter (G) is calculated by a formula (1) below.

$$G=\{(R+B)/2\}\times 2 \quad \text{formula (1)}$$

In the pixel output compensation processing section 61, as described by the formula (1), an average value of the R and B filters is calculated and the calculated value is doubled, and thereby the pixel output value of the G filter is obtained. This is a compensating process of the pixel output value of the G filter. The calculated pixel output value of the G filter is set as the pixel output value of the two pixel output of the G filter in the processing unit (2×2 pixels) described above. The calculated pixel output value of the G filter is data which is beyond 12-bit, therefore here the pixel output values of the R and B filters are once converted into 14-bit data. Both of the maximum values of the R and B filters are 4095 (12-bit), and the maximum value of the pixel output of the G filter becomes 8190, therefore it is possible to deal with as 14-bit data.

Before the brightness level judging section 60 judges if the pixel output of the G filter is equal to or more than the saturation level or not, it is necessary to complete a compensation of a defective pixel. That is, in a case where there is a defective pixel in a pixel where the G filter is provided and a pixel which outputs a value which is always saturated, an inappropriate value may be set to a pixel output value of a normal pixel where the G filter is provided in a same processing unit where there is the defective pixel.

In addition, in a case where there is a defective pixel in pixels where the R and B filters are provided, the pixel output value calculated by the formula (1) may be an incorrect value. Therefore, in the present embodiment, the CCD I/F 34 has a defective pixel removal processing section (not illustrated) which removes the defective pixel.

Figure 8A:
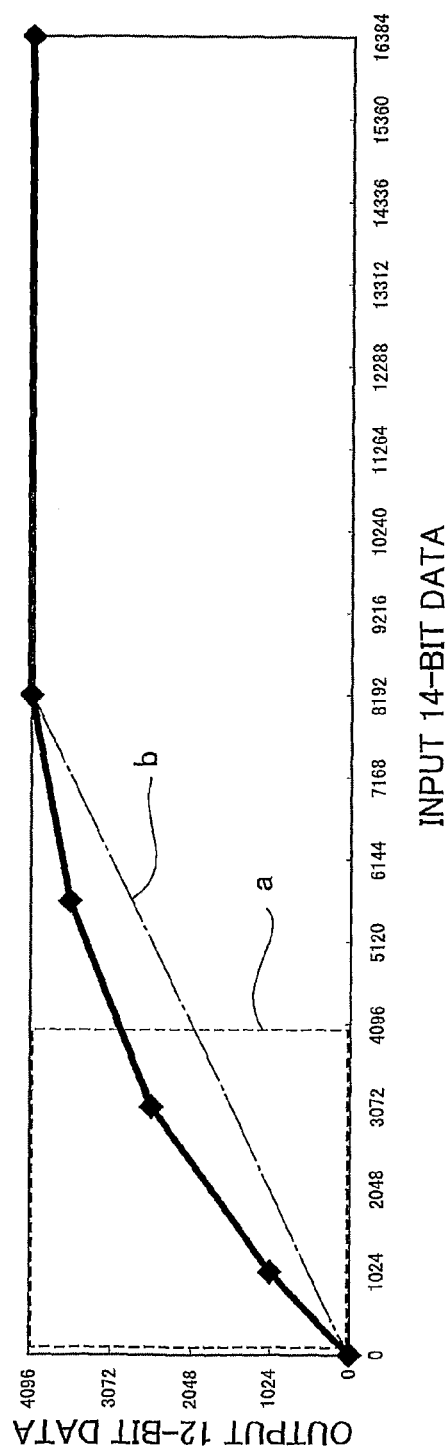
FIG. 8A illustrates a bit compression conversion characteristic of a pixel output in a case where the dynamic range is expanded by 200% in the digital camera according to the embodiment 1 of the present invention.

And, the pixel output compensation processing section 61 of the dynamic range expansion compensating section 50 outputs to the bit compressing section 51 the pixel output data of the R and B filters and the pixel output data of the G filter which is equal to or more than the saturation level and is compensated. The bit compressing section 51, for example, on the basis of a bit compression conversion characteristic (a four-section broken line approximation characteristic in which three sectional points are specified and intervals between them are approximated by a straight line) as illustrated in FIG. 8A, compresses the extended 14-bit pixel output of the R, B and G filters into 12-bit. In FIG. 8A, "a" is a 12-bit range of input data (dot-line part). "b" (dash-dotted line) illustrates a simple linear bit compression conversion characteristic to multiply data of a maximum value of 8190 by ½.

In the bit compression conversion characteristic illustrated in FIG. 8A, input 14-bit data (the pixel output value of the G filter) of 8190 becomes output 12-bit data of the maximum value of 4095, therefore a compression is performed on 8190 so as to become 4095. And the pixel output value of the R and B filters is compressed in accordance with the bit compression conversion characteristic of the pixel output value of the G filter.

In the present embodiment, as an example of the bit compression conversion characteristic, a bit compression conversion characteristic having three sectional points is used. By use of this bit compression conversion characteristic, two effects which are not obtained by the simple linear non-sectional point bit compression conversion characteristic (dash-dotted line "b" in FIG. 8A) are obtained.

A first effect is that a greater number of bits can be allocated to a data range with a high reliability. That is, in a case where the compensating process is performed on the pixel output of the G filter, the compensating process is performed on a data range where the pixel output of the G filter is equal to or more than the saturation level and is not performed on the data range where the pixel output of the G filter is less than the saturation level.

That is, for example, in a case where the pixel output of the G filter which is saturated is compensated by the formula (1), depending on a color of a main photographic subject, in the data range where the compensating process is performed, a brightness level of a photographic subject is not often accurately reproduced. On the other hand, in the data range where the compensating process is not performed, data (analog RGB image signal) outputted from the CCD 20 having the RGB filter is directly used, therefore the reliability of data becomes high.

In the bit compression conversion characteristic (FIG. 8A) used in the present embodiment, for example, in a case where input 14-bit data is 1024, which is away from the saturation level, output 12-bit data becomes 1024, and the data outputted from the CCD 20 is directly used. On the other hand, for example, in a case where input 14-bit data is 3072, which is close to the saturation level, output 12-bit data becomes 2560 and a value becomes smaller than the value before the compensating process is performed, and the number of bits which represents data (bit allocation amount) is decreased and the reliability of data is degraded.

Thus, in the present embodiment, not the simple linear non-sectional point bit compression conversion characteristic, but the bit compression conversion characteristic having three sectional points is used, and thereby a larger amount of bit allocation can be set to the data range with high data reliability.

A second effect is that brightness tone from low to middle brightness can be represented accurately. That is, in a case where a compression with the simple linear bit compression conversion characteristic is performed, in a range of the low to middle brightness side where the compensating process is not performed and in a range of the high brightness side where the compensating process is performed, a bit allocation amount is equal after a bit compression. That is, in the entire brightness range, the bit allocation amount after the bit compression is uniform, and is smaller than the bit allocation amount before the bit compression. Therefore, an image obtained becomes an image with a poor tone property. On the other hand, in a case where the bit compression conversion characteristic of the present embodiment is used, a compression rate such that the bit allocation amount can be approximately equal before and after bit compressions is used, to the pixel output in the low to middle brightness level which is equal to or less than the saturation level. And thereby, a tone property of an image in the low to middle brightness level is favorably maintained.

In the present embodiment, in a case where 14-bit data of the pixel output of the G filter is reduced to 12-bit, the bit compression is structured to be performed by the broken line approximation characteristic (conversion characteristic) having four sections in which the three sectional points are specified and intervals between them are approximated by a straight line as illustrated in FIG. 8A, however the number of sections are not limited particularly. For example, a broken line approximation characteristic having two sections in which one sectional point is specified may be applied. However, the bit allocation amount is changed in the vicinity of the sectional point and the two effects described above become smaller in a section after the sectional point (high brightness section). Therefore, the bit compression conversion characteristic preferably is a broken line approximation characteristic having the number of sections which is equal to or more than three sections.

Figure 8B:
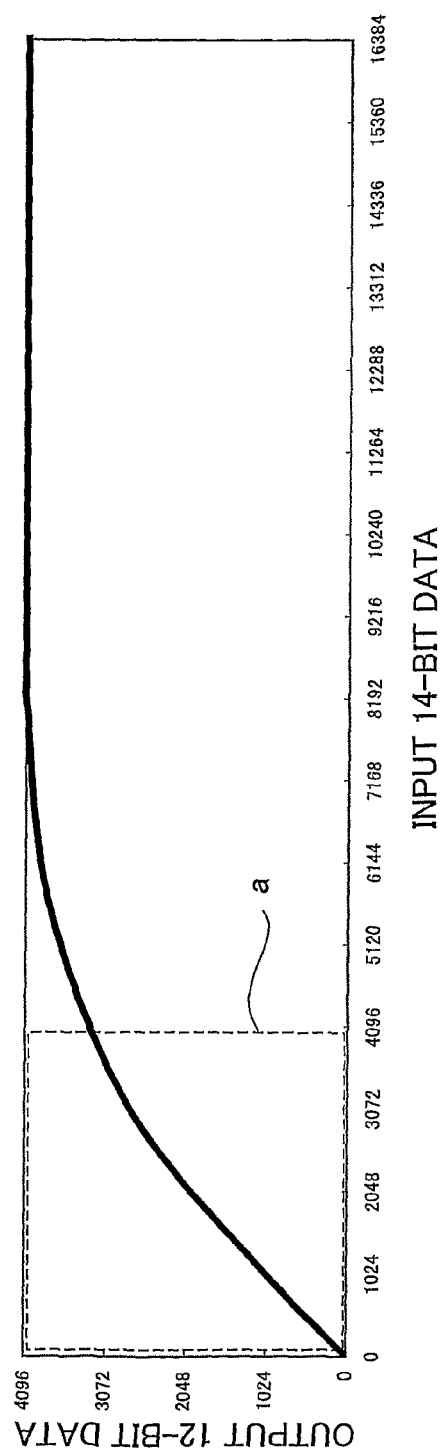
FIG. 8B illustrates another bit compression conversion characteristic of the pixel output in the digital camera according to the embodiment 1 of the present invention.

In addition, the bit compression conversion characteristic to reduce the 14-bit data of the pixel output of the G filter to 12-bit, as illustrated in FIG. 8B, may be a conversion characteristic by a curve line not having a plurality of sectional points. The conversion characteristic by this curve line is equal to a broken line approximation characteristic in which the number of sections is 8190. In FIG. 8B, "a" is a 12-bit range of input data (dot-line part).

Additionally, in regard to values from 0 to 8192 of input 14-bit data, a look-up table having numerical value data after compressing to 12-bit data is provided, and thereby 14-bit pixel output of the G filter can be compressed favorably to 12-bit.

The pixel output data of the R, G and B filters which are compressed from 14-bit to 12-bit in the bit compressing section 51 is outputted to the white balance controlling section 52. The white balance controlling section 52 amplifies respectively the output data of the R, G, and B filters. In this case, the controlling section 28 calculates a compensation value to adjust a white balance based on the AWB evaluation value calculated in the CCD I/F 34, and outputs the calculated compensation value to the white balance controlling section 52. The white balance controlling section 52 adjusts the white balance based on this compensation value.

And each pixel output data (12-bit) of the R, G and B filters where the white balance is adjusted in the white balance controlling section 52 is outputted to the RGB data producing section 53. The RGB data producing section 53 performs a compensation calculating process on RAW-RGB data corresponding to data of one color of RGB for one pixel, and produces data to correspond to all data of RGB for one pixel.

Figure 9:
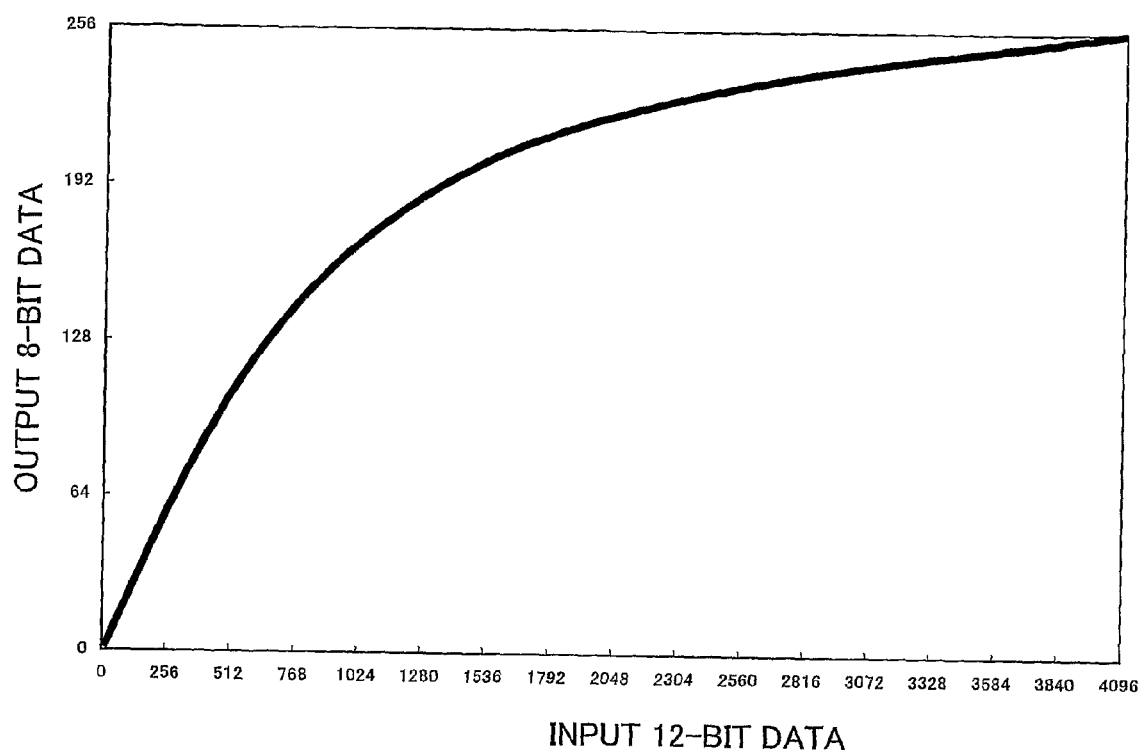
FIG. 9 illustrates a conversion characteristic (conversion table) where 12-bit RGB data is converted to 8-bit RGB data (y conversion) in the digital camera according to the embodiment 1 of the present invention.

All RGB data (12-bit) which is produced in the RGB producing section 53 is outputted to the tone curve converting section 54. The tone curve converting section 54 performs a γ conversion which converts 12-bit RGB data into 8-bit RGB data based on a conversion characteristic (conversion table) as illustrated in FIG. 9, and produces 8-bit RGB data. This 8-bit RGB data is outputted to the RGB-YUV converting section 55.

The RGB-YUV converting section 55 converts 8-bit RGB data into 8-bit YUV data by a matrix calculation and outputs to the image size convertor 56. The image size convertor 56 reduces or extends 8-bit YUV data into a desired image size, and then outputs to the brightness histogram producing section 57 and the edge enhancing section 58.

The brightness histogram producing section 57 produces a brightness histogram based on 8-bit YUV data. The edge enhancing section 58 performs an edge enhancing process and the like on 8-bit YUV data, and then outputs to the SDRAM 23 via the memory controller 35. This 8-bit YUV data outputted to the SDRAM 23 is stored in the SDRAM 23.

Thus, as for the digital camera 1 of the present embodiment, in the processing unit, in a case where a shooting state in which the pixel output of the G filter with high sensitivity is equal to or more than the saturation level (for example, in a case where there is a high brightness part in a background and so on of a shooting image), a user presses the menu button 12 and the confirmation button 13 and selects, for example, an item of "200% dynamic range" from the shooting setting screen, and confirms. By this process, the pixel output of the G filter which is saturated is compensated based on the pixel output of the R and B filters where sensitivity is lower than the G filter. Therefore, as illustrated in FIG. 3, the pixel output is compensated by 200% (dash-dotted line parts of the pixel output of the G filter of "d" and "e" in FIG. 3), and the dynamic range can be expanded by 200% at one shooting.

Therefore, even in a case where there is a high brightness part in a background and the like of a shooting image, the dynamic range of the image is expanded and thereby an occurrence of an overexposure is prevented, and it is possible to obtain an image having a favorable brightness tone property.

Figure 10A:
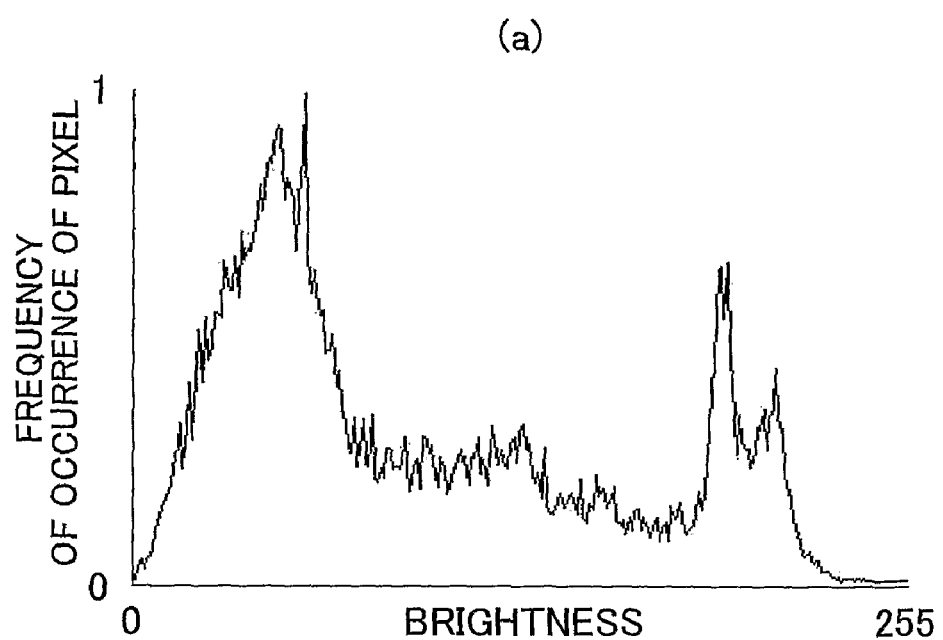
FIG. 10A is a histogram which illustrates a relationship between a frequency of a pixel occurrence and brightness in a case where the dynamic range expanding process is performed in the digital camera according to the embodiment 1 of the present invention.
Figure 10B:
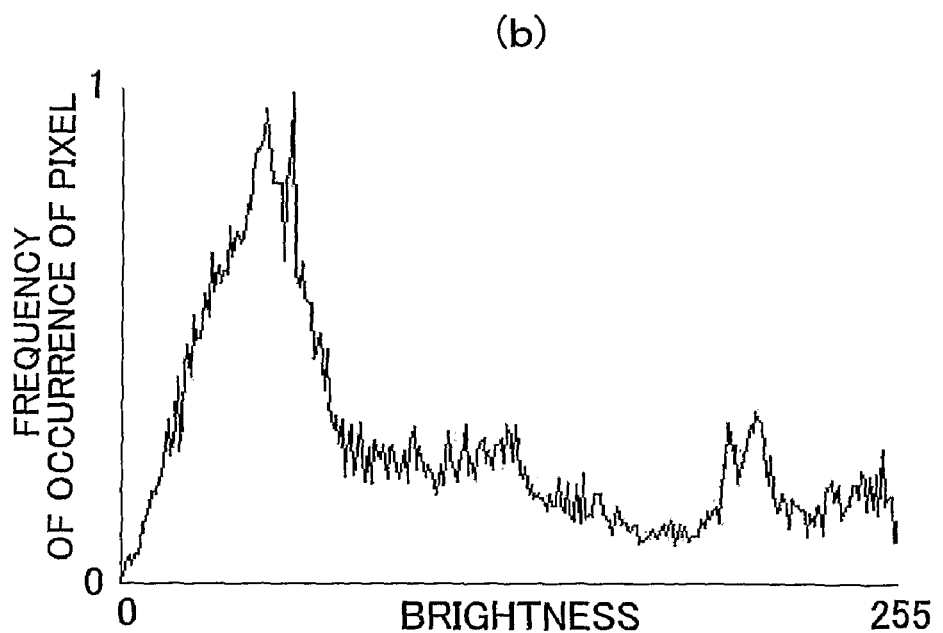
FIG. 10B is a histogram which illustrates a relationship between a frequency of a pixel occurrence and brightness in a case where the dynamic range expanding process is not performed in the digital camera according to the embodiment 1 of the present invention.

FIG. 10A is an example of a histogram which is produced in the brightness histogram producing section 57, in a case where the 200% dynamic range expansion process as described above is performed on a shooting image P in which the pixel output of the G filter is equal to or more than the saturation level. FIG. 10B is another example of a histogram which is produced in the brightness histogram producing section 57, in a case where the dynamic range expansion process of the present embodiment is not performed on a shooting image P in which the pixel output of the G filter is equal to or more than the saturation level. In FIGS. 10A and 10B, a horizontal axis illustrates brightness (256 tones from 0 to 255 (8-bit)) and a vertical axis illustrates a frequency of a pixel occurrence (0 to 1 (=100%)).

As is clear from the histogram illustrated in FIG. 10A, in a case where the dynamic range expansion process of the present embodiment is performed, there is almost no pixel occurrence in a vicinity of a maximum brightness part (255) and almost no overexposure occurs. On the other hand, as is clear from the histogram illustrated in FIG. 10B, in the case where the dynamic range expansion process of the present embodiment is not performed, there is a pixel occurrence in the vicinity of the maximum brightness part (255) and an overexposure occurs.

An explanation above describes that A in FIG. 3, which is a judging value of the saturation level, corresponds to a 12-bit maximum value of 4095 after compensating, however the judging value of the saturation level does not always have to be the 12-bit maximum value of 4095. For example, in a high brightness part of the vicinity where an output is completely saturated, in a CCD having an RGB filter in which a linearity of the pixel output is not good, a smaller value than the 12-bit maximum value of 4095 after compensating, for example, 4032, is set to be the judging value of the saturation level (A in FIG. 3), and a pixel output beyond the value above may be a compensating process object.

Depending on a system structure of a digital camera, even in a case of a high-brightness photographic subject, there is a case where the pixel output does not reach the 12-bit maximum value of 4095. Likewise, even in that case, the judging value of the saturation level may be set to be a smaller value than 4095.

Thus, even in a case where the judging value of the saturation value is set to be less than the 12-bit maximum value of 4095, an output of the bit compressing section 51 can be 4095 by switching a conversion curve in FIG. 9 in accordance with its characteristic, and the dynamic range can be expanded without changing the following processes.

Incidentally, in the histogram illustrated in FIG. 10A in the case where the 200% dynamic range expansion process is performed, there is an area in which there is almost no frequency of a pixel occurrence in the vicinity of the maximum brightness part (255). This is because the dynamic range is expanded more than necessary, though there is almost no image data originally in the vicinity of this maximum brightness part, and it illustrates that all tones of brightness (256 tones from 0 to 255) which are representable by 8-bit RGB are not effectively used.

Accordingly, in the present invention, it is possible to change the expansion rate to, for example, 130% (4/3 times), 160% (5/3 times), 200% and so on so as to effectively use a range of all tones which are representable by 8-bit RGB for the shooting image in which the pixel output of the G filter is equal to or more than the saturation level.

That is, in a case where there is an extremely bright part in a part of a background of a photographic subject which is desired to be shot, when a user wishes to expand the dynamic range by effectively using the range of all tones which are representable by 8-bit RGB, for example, as illustrated in FIG. 6B, the item of "130% dynamic range" is selected in the shooting setting screen displayed on the liquid crystal display monitor 9 by pressing the menu button 12 and "130% dynamic range" is confirmed by pressing the confirmation button 13.

Accordingly, the dynamic range expanding process is turned on, and the controlling section 28 outputs a control signal in which the expansion rate of the dynamic range is 130% to the pixel output compensation processing section 61. And the pixel output compensation processing section 61 performs an expanding process in which the dynamic range is expanded by 130% corresponding to the expansion rate of the dynamic range which is set on the basis of the control signal.

Figure 11:
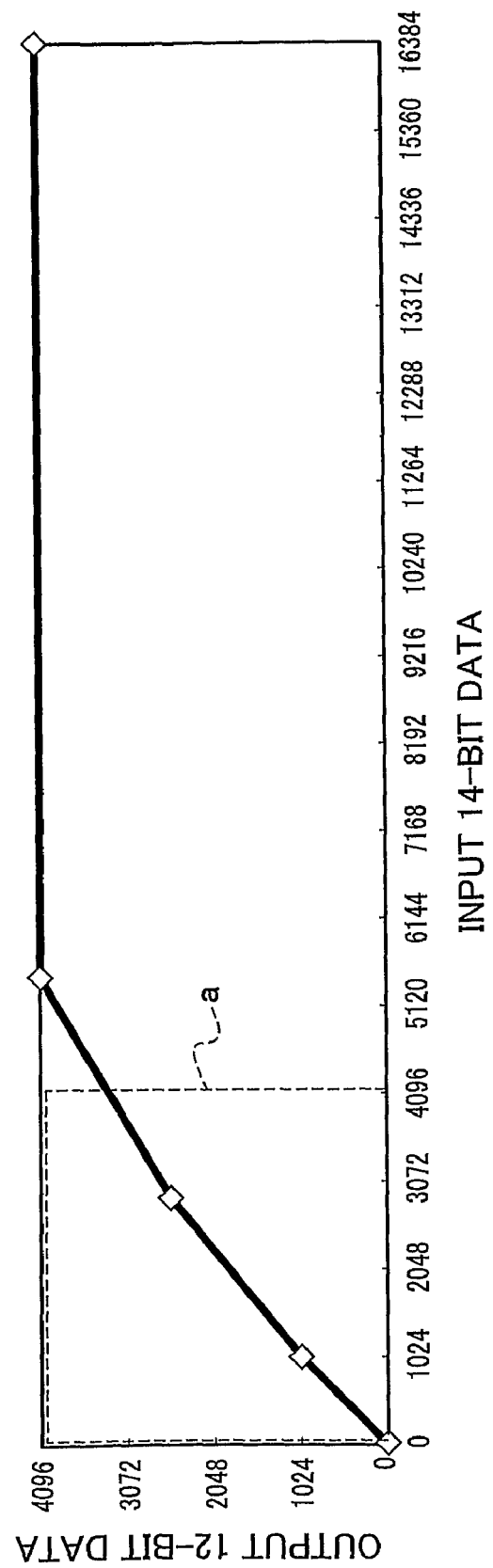
FIG. 11 illustrates a bit compression conversion characteristic of the pixel output in a case where the dynamic range is expanded by 130% in the digital camera according to the embodiment 1 of the present invention.

In a case where the dynamic range is expanded by 130%, when the pixel output of the G filter which is converted from 12-bit to 14-bit in the pixel output compensation processing section 61 is compressed to 12-bit in the bit compressing section 51, for example, a bit compression conversion characteristic as illustrated in FIG. 11 (a three-section broken line approximation characteristic in which two sectional points are specified and intervals between them are approximated by a straight line) is used. In FIG. 11, "a" is a 12-bit range of input data (dot-line part).

In a bit compression conversion characteristic illustrated in FIG. 11, input 14-bit data (the pixel output of the G filter) of 5461 becomes output 12-bit data at the maximum value of 4095, therefore a compression is performed on 5461 so as to become 4095. And the pixel output of the R and B filters is also compressed in accordance with the bit compression conversion characteristic of the pixel output value of the G filter.

Figure 12:
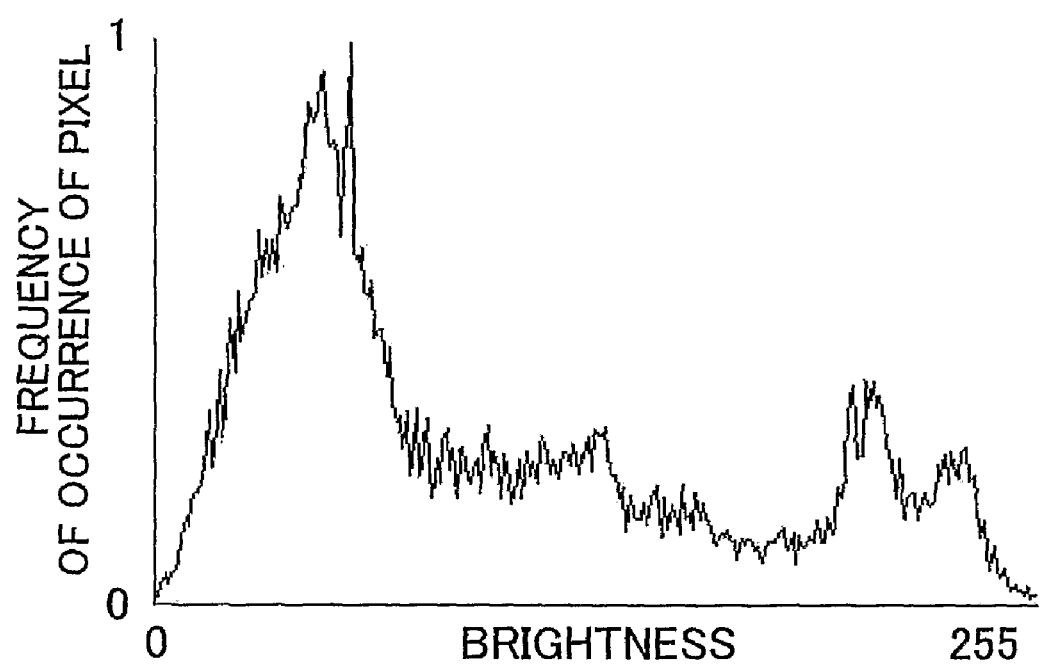
FIG. 12 is a histogram which illustrates a relationship between a frequency of a pixel occurrence and brightness in the case where the dynamic range is expanded by 130% in the digital camera according to the embodiment 1 of the present invention.

FIG. 12 is an example of a histogram which is produced in the brightness histogram producing section 57, in a case where the dynamic range is expanded by 130% on a shooting image P in which the pixel output of the G filter is equal to or more than the saturation level. In FIG. 12, a horizontal axis illustrates brightness (256 tones from 0 to 255 (8-bit)) and a vertical axis illustrates a frequency of a pixel occurrence (0 to 1 (=100%)).

In a case where the dynamic range is expanded by 200%, there is an area in which there is almost no frequency of the pixel occurrence in the vicinity of the maximum brightness part (255) (see FIG. 10A). However, as is clear from a histogram illustrated in FIG. 12, in the case where the dynamic range is expanded by 130%, there is no area in which there is almost no frequency of the pixel occurrence in the vicinity of the maximum brightness part (255), and the range of all tones which is representable by 8-bit RGB can be effectively used, and an occurrence of overexposure in the maximum brightness part (255) can be prevented.

In the case where the dynamic range is expanded by 130%, the pixel output value of the G filter which is converted into 14-bit is compressed into 12-bit based on the bit compression conversion characteristic illustrated in FIG. 11, however a compression is not limited to the above. For example, the pixel output value of the G filter which is calculated by the formula (1) described above is compensated by, for example, a formula (2) below, and is compressed into 12-bit based on the bit compression conversion characteristic illustrated in FIG. 8.

$$G' = G \times (2/(4/3)) \qquad \text{formula (2)}$$

As described above, in FIG. 11, when output 12-bit data becomes the maximum value of 4095, input 14-bit data (the pixel output value of the G filter) is 5461. When this value of 5461 is taken as a maximum value of the pixel output value of the G filter and this value of 5461 is substituted for G of the formula (2), the maximum value of the G filter after compensating becomes 8191. In the bit compression conversion characteristic illustrated in FIG. 8, in a case where input 14-bit data (the pixel output value of the G filter) is 8191, output 12-bit data becomes 4091.

Thus, the pixel output value of the G filter is compensated by the formula (2), and thereby, even in a case where the dynamic range is expanded by 130% (4/3 times), the bit compression conversion characteristic illustrated in FIG. 8 can be used.

In addition, likewise, in a case where the dynamic range is expanded by 160%, as illustrated in FIG. 6C, an item of "160% dynamic range" is selected in the shooting setting screen displayed on the liquid crystal display monitor 6 by pressing the menu button 12, and "160% dynamic range" is confirmed by pressing the confirmation button 13.

Accordingly, the dynamic range expansion process is turned on, and the controlling section 28 outputs a control signal in which the expansion rate of the dynamic range is 160% to the pixel output compensation processing section 61. And the pixel output compensation processing section 61 performs an expanding process in which the dynamic range is expanded by 160% corresponding to the expansion rate of the dynamic range which is set on the basis of the control signal.

Figure 13:
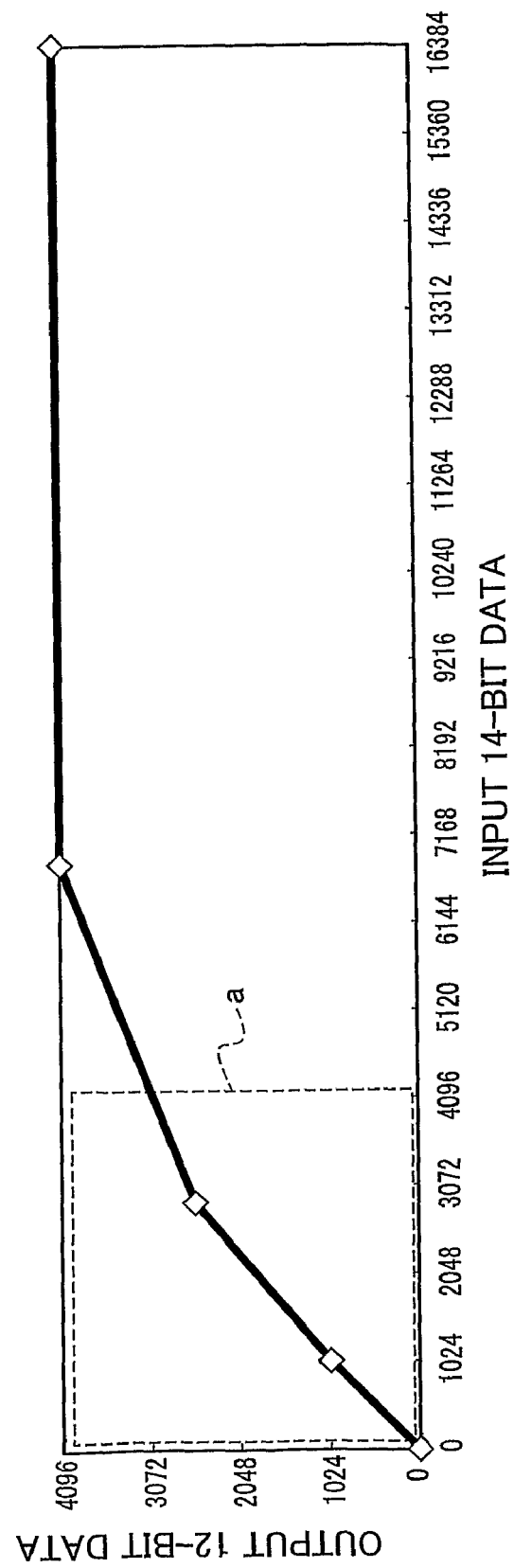
FIG. 13 illustrates a bit compression conversion characteristic of the pixel output in a case where the dynamic range is expanded by 160% in the digital camera according to the embodiment 1 of the present invention.

In the case where the dynamic range is expanded by 160%, when the pixel output of the G filter which is converted from 12-bit to 14-bit in the pixel output compensation processing section 61 is compressed into 12-bit in the bit compressing section 51, for example, a bit compression conversion characteristic as illustrated in FIG. 13 (a three-section broken line approximation characteristic in which two sectional points are specified and intervals between them are approximated by a straight line) is used. In FIG. 13, "a" is a 12-bit range of input data (dot-line part).

In a bit compression conversion characteristic illustrated in FIG. 13, input 14-bit data (the pixel output of the G filter) of 6826 becomes output 12-bit data at the maximum value of 4095, therefore a compression is performed on 6826 so as to become 4095. And the pixel output of the R and B filters is also compressed in accordance with the bit compression conversion characteristic of the pixel output value of the G filter.

Figure 14:
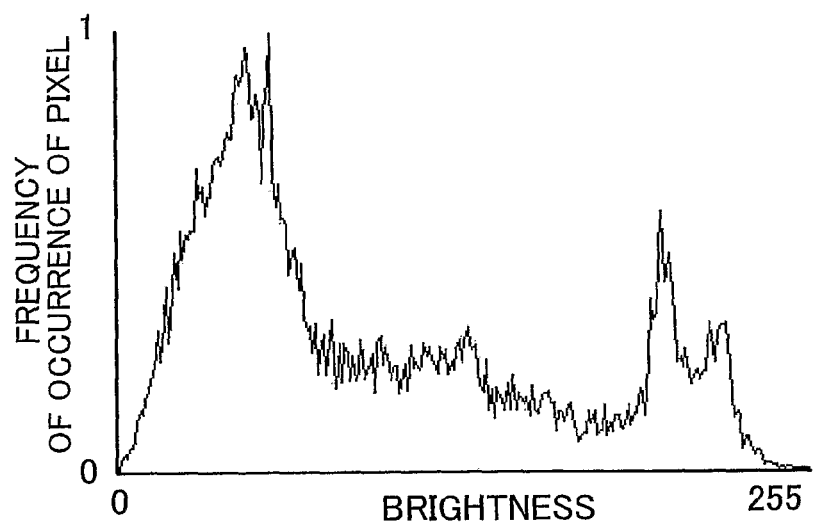
FIG. 14 is a histogram which illustrates a relationship between a frequency of a pixel occurrence and brightness in the case where the dynamic range is expanded by 160% in the digital camera according to the embodiment 1 of the present invention.

FIG. 14 is an example of a histogram which is produced in the brightness histogram producing section 57, in a case where the dynamic range is expanded by 160% on a shooting image P in which the pixel output of the G filter is equal to or more than the saturation level. In FIG. 14, a horizontal axis illustrates brightness (256 tones from 0 to 255 (8-bit)) and a vertical axis illustrates a frequency of a pixel occurrence (0 to 1 (=100%)).

In a case where the dynamic range is expanded by 200%, there is an area in which there is almost no frequency of the pixel occurrence in the vicinity of the maximum brightness part (255) (see FIG. 10A). However, as is clear from a histogram illustrated in FIG. 14, in the case where the dynamic range is expanded by 160%, there is no area in which there is almost no frequency of the pixel occurrence in the vicinity of the maximum brightness part (255), and the range of all tones which is representable by 8-bit RGB can be effectively used, and an occurrence of an overexposure in the maximum brightness part (255) can be prevented.

In the case where the dynamic range is expanded by 160%, the pixel output value of the G filter which is converted into 14-bit is compressed into 12-bit based on the bit compression conversion characteristic illustrated in FIG. 11, however a compression is not limited to the above. For example, the pixel output value of the G filter which is calculated by the formula (1) described above is compensated by a formula (3) below and is compressed into 12-bit based on the bit compression conversion characteristic illustrated in FIG. 8.

$$G' = G \times (2/(5/3)) \quad \text{formula (3)}$$

As described above, in FIG. 13, when output 12-bit data becomes the maximum value of 4095, input 14-bit data (a pixel output value of the G filter) is 6826. When this value of 6826 is taken as a maximum value of the pixel output value of the G filter and this value of 6826 is substituted for G of the formula (3), the maximum value of the G filter after compensating becomes 8191. In the bit compression conversion characteristic illustrated in FIG. 8, in a case where input 14-bit data (the pixel output value of the G filter) is 8191, output 12 bit data becomes 4091.

Thus, the pixel output value of the G filter is compensated by the formula (3), and thereby, even in a case where the dynamic range is expanded by 160% (5/3 times), the bit compression conversion characteristic illustrated in FIG. 8 can be used.

Additionally, in the present embodiment, for example, in a case where values of the pixel output of the G filter and the pixel output of the R filter (or the B filter) are equal to or more than the saturation level, if the pixel output value of the R filter (or the B filter) is not compensated, a compensation value of the pixel output of the G filter which is calculated by the formula (1) is inaccurate, and a bit compressing process of the R filter and the G filter is performed by the compression rate which is used by the bit compressing process of the G filter, and thereby there is a possibility that a hue may be changed.

Accordingly, in a case where values of the pixel output of the G filter and the pixel output of the R filter (or the B filter) are equal to or more than the saturation level, it is preferable not to perform the dynamic range expanding process by compensating. Or in a case where a plurality of pixel output values (values of the pixel output of the G filter and the pixel output of the R filter (or the B filter)) is equal to or more than the saturation level, it is assumed that brightness of a processing unit is extremely bright, and a predetermined value in which the pixel output value of the G filter is determined beforehand, for example, $$\text{pixel output of the } G \text{ filter} = 4096 \times 1.8 = 7372 \text{ (14-bit)}$$

and so on may be set.

In the present embodiment, as illustrated in FIG. 4, it is structured such that the 14-bit RAW-RGB data (the pixel output data of the R, G and B filters) which is outputted from the dynamic range expansion compensating section 50 is converted into 12-bit in the bit compressing section 51, and data processing of 12-bit is performed in the white balance controlling section 52 and the RGB data producing section 53. However, for example, another structure in which the bit compressing section 51 is provided behind the RGB data producing section 53 and 14-bit data which is outputted from the RGB data producing section 53 is compressed into 12-bit data may be applied.

[Embodiment 2]

Figure 15:
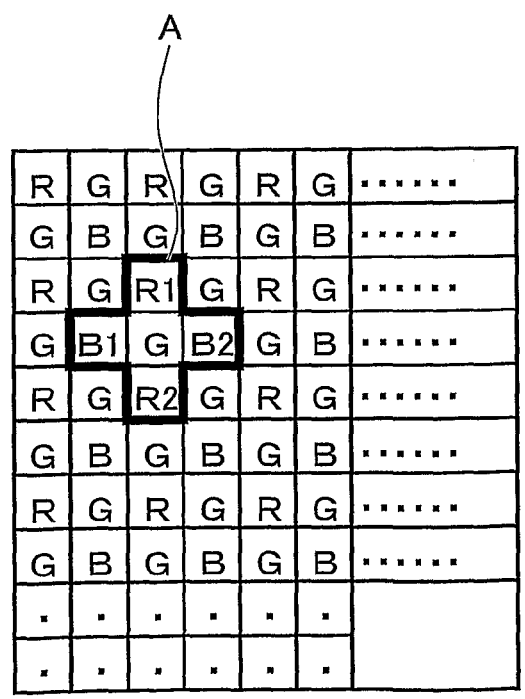
FIG. 15 illustrates a state of a pixel placement of a CCD having an RGB filter and a processing unit where a dynamic range expanding process is performed in the digital camera according to an embodiment 2 of the present invention.

In the embodiment 1, as illustrated in FIG. 7, for the CCD 20 having the RGB filter, 2×2 pixels are taken as the processing unit (minimum unit). In the present embodiment, as illustrated in FIG. 15, five pixels in total (five pixels in a bold-line frame A), which are one pixel where the G filter is set, two pixels where the R filters (R1 and R2) are set which are adjacent to the pixel where the G filter is set, and two pixels where the B filters (B1 and B2) are set which are adjacent to the pixel where the G filter is set, is taken as a processing unit (minimum unit), and it is an example in which the processing unit of the present embodiment has a wider range than the processing unit of the embodiment 1. A structure of the digital camera 1, a monitoring process, a still image shooting process, and a dynamic range expanding process of the present embodiment are the same as those of the embodiment 1.

In a case where the pixel output of the G filter in the processing unit (the bold-line frame A) is equal to or more than the saturation level, a sensitivity of the G filter is approximately twice as high as the R and B filters as described, and a pixel output value of the G filter (G) is calculated by a formula (4) below.

$$G=[\{(R1+R2)/2+(B1+B2)/2\}/2]\times 2 \qquad \text{formula (4)}$$

And the pixel output compensation processing unit 61 of the dynamic range expansion compensating section 50 illustrated in FIG. 5 sets the pixel output value of the G filter which is calculated by the formula (4) as a pixel output value of the G filter in the processing unit (the bold-line frame A) illustrated in FIG. 15, and hereinafter the same processes as the embodiment 1 are performed.

Thus, an influence of sensitivity difference of other pixels (pixels where the R1 and R2 filters are set and pixels where the B1 and B2 filters are set) is moderated by enlarging the processing unit, and thereby it is possible to calculate a more accurate pixel output of the G filter. That is, it is possible to more accurately perform the dynamic range expansion compensating process on the G filter.

[Embodiment 3]

Figures 16, 17:
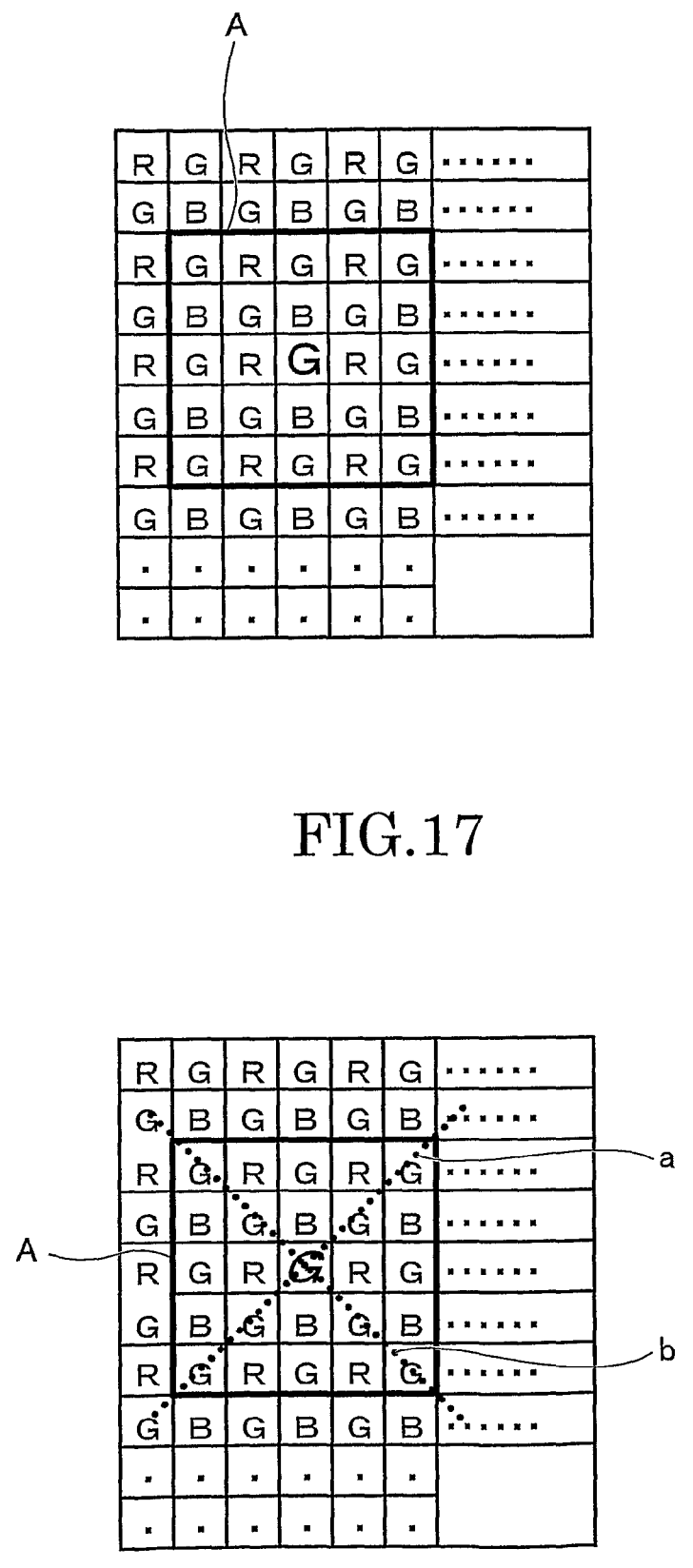

The present embodiment, as illustrated in FIG. 16, for the CCD 20 having the RGB filter, it is an example in which the processing unit (the bold-line frame A) is much larger than the processing unit of the embodiment 2. A structure of the digital camera 1, a monitoring process, a still image shooting process, and a dynamic range expanding process in the present embodiment are the same as those of the embodiment 1.

When the processing unit is enlarged, a signal process is performed based on brightness information in a wide range, and this is equal to a low-pass filter process. Accordingly, a sharpness of an edge part of a brightness variation may be reduced. Therefore, in the present embodiment, a size of the processing unit is partially changed, for example, by use of the AF evaluation value.

In the CCD I/F 34 of the signal processing section 22 illustrated in FIG. 2, the AF evaluation value to perform the AF is calculated as described above. This AF evaluation value corresponds to an output of a high-pass filter (HPF), and a large value is outputted in a part where there is a brightness variation in an image plane of a shooting image. The controlling section 28 judges a part where there is a brightness variation in the image plane and a part where there is no brightness variation in the image plane. And the controlling section 28 controls the dynamic range expansion compensating section 50 to set to narrow the processing unit in the part where there is a large brightness variation and to set to enlarge the processing unit in the part where there is a small brightness variation as illustrated in FIG. 16, on the basis of this judging data.

Thus, in a case where the processing unit is set to be basically large, the processing unit is set to be narrow in the part where there is a brightness variation. And thereby, it is possible to accurately perform the dynamic range expansion compensating process without reducing a resolution.

[Embodiment 4]

In the present embodiment, for the CCD 20 having the RGB filter, as illustrated in FIG. 17, 5×5 pixels, which are 5 pixels in a horizontal direction and 5 pixels in a vertical direction in a bold-line frame A, are taken as a processing unit. In this processing unit, a plurality of pixels of the G filter are adjacent in diagonal directions ("a" and "b" directions in FIG. 17). In the present embodiment, the pixel output of the G filter in a center part of the processing unit (bold-line frame A) is judged if it is equal to or more than the saturation level or not.

Figure 18:
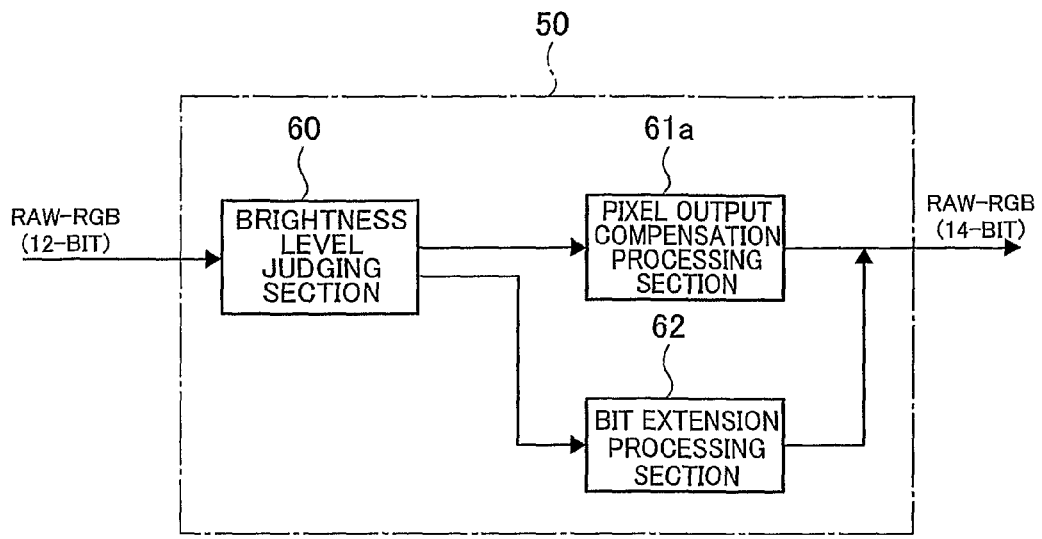
FIG. 18 is a block diagram of a dynamic range expansion compensating section in the digital camera according to the embodiment 4 of the present invention.

In addition, the dynamic range expansion compensating section 50 of the YUV converting section 36 of the present embodiment, as illustrated in FIG. 18, comprises a brightness level judging section 60, a pixel output compensation processing section 61a, and a bit extension processing section 62. A structure of the digital camera 1, a monitoring process, a still image shooting process, and a dynamic range expanding process of the present embodiment are the same as those of the embodiment 1.

The brightness level judging section 60 judges if the pixel output of the G filter in the center part of the processing unit is equal to or more than the saturation level. The pixel output compensation processing section 61a, in a case where the pixel out of the G filter in the center part is judged to be equal to or more than the saturation level by the brightness level judging section 60, performs a compensating process on the pixel output of the G filter in the center part on the basis of pixel output of another plurality of G filters which is placed in diagonal directions ("a" and "b" directions in FIG. 17).

The bit extension processing section 62, in a case where the pixel output of the G filter is judged to be less than the saturation level in the brightness level judging section 60, performs a bit extension process from 12-bit to 14-bit, without performing a conversion of an output level, on the pixel output of the G filter and the pixel output of the R and B filters.

In the present embodiment, when the dynamic range expanding process is performed, in a case where the pixel output of the G filter in the center part of the processing unit (bold-line frame A) illustrated in FIG. 17 is judged to be equal to or more than the saturation level by the brightness level judging section 60 of the dynamic range expansion compensating section 50, it is possible for the pixel output compensation processing section 61a to compensate the pixel output of the G filter in the center part based on a distribution (see FIGS. 19A and 19B) of values of the pixel output of a plurality of the G filters which is placed in diagonal directions ("a" and "b" directions in FIG. 17).

Figure 19A:
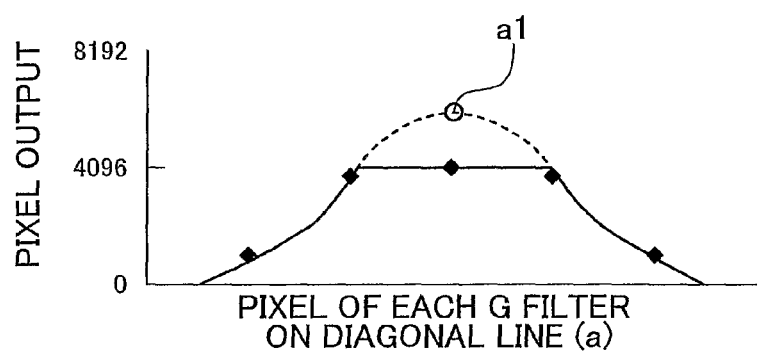
FIG. 19A is an explanatory view of a dynamic range expansion compensation in the digital camera according to the embodiment 4 of the present invention.
Figure 19B:
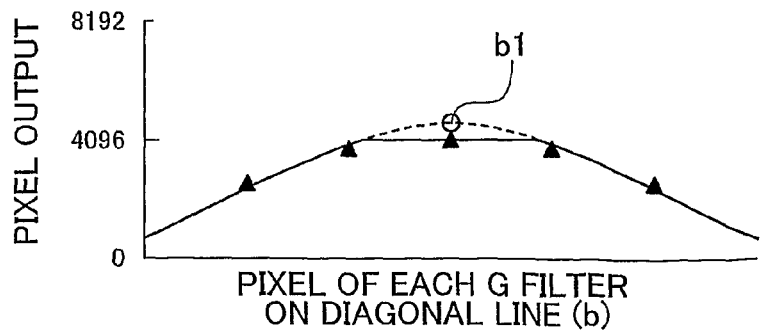
FIG. 19B is another explanatory view of the dynamic range expansion compensation in the digital camera according to the embodiment 4 of the present invention.

FIG. 19A is a graph which illustrates values of the pixel output of each G filter in a diagonal line in "a" direction. From this graph, it is possible to estimate that a compensation value "a1" of the pixel output of the G filter in the center part may be approximately 6000 (14-bit). In addition, FIG. 19B is a graph which illustrates values of the pixel output of each G filter in a diagonal line in "b" direction. From this graph, it is possible to estimate that a compensation value "b1" of the pixel output of the G filter in the center part may be approximately 5000 (14-bit). In FIGS. 19A and 19B, the saturation level of the pixel output of the G filter in the center part is 4095 (12-bit).

From these estimated results, values of the pixel output of the G filters in the center part of the processing unit can be estimated at approximately 5000 to 6000. In a case of confirming the value of the pixel output of the G filter, for example, 5500 which is an average of these two compensation values, is taken as the pixel output of the G filter.

Thus, in a case where the pixel output of the G filter in the center part of the processing unit is equal to or more than the saturation level, it is possible to perform an accurate dynamic range expansion compensating process by compensating the pixel output of the G filter in the center part based on a distribution of values of the pixel output of other G filters.

Additionally, in the present embodiment, in a case where a value of the pixel output of the G filter which is equal to or more than the saturation level is compensated, it is structured to compensate by values of the pixel output of a plurality of the G filters which is placed in diagonal directions in the processing unit, however considering together at the same time, values of the pixel output of a plurality of G filters which are placed in a horizontal and a vertical direction in the processing unit, the value of the pixel output of the G filter which is equal to or more than the saturation level may be estimated. And thereby, it is possible to perform a more accurate dynamic range expansion compensating process.

In the present embodiment, only pixels of the G filter in the processing unit have been explained, however, likewise, the dynamic expansion compensating process can be performed on pixels of the R and B filters.

[Embodiment 5]

Figure 20:
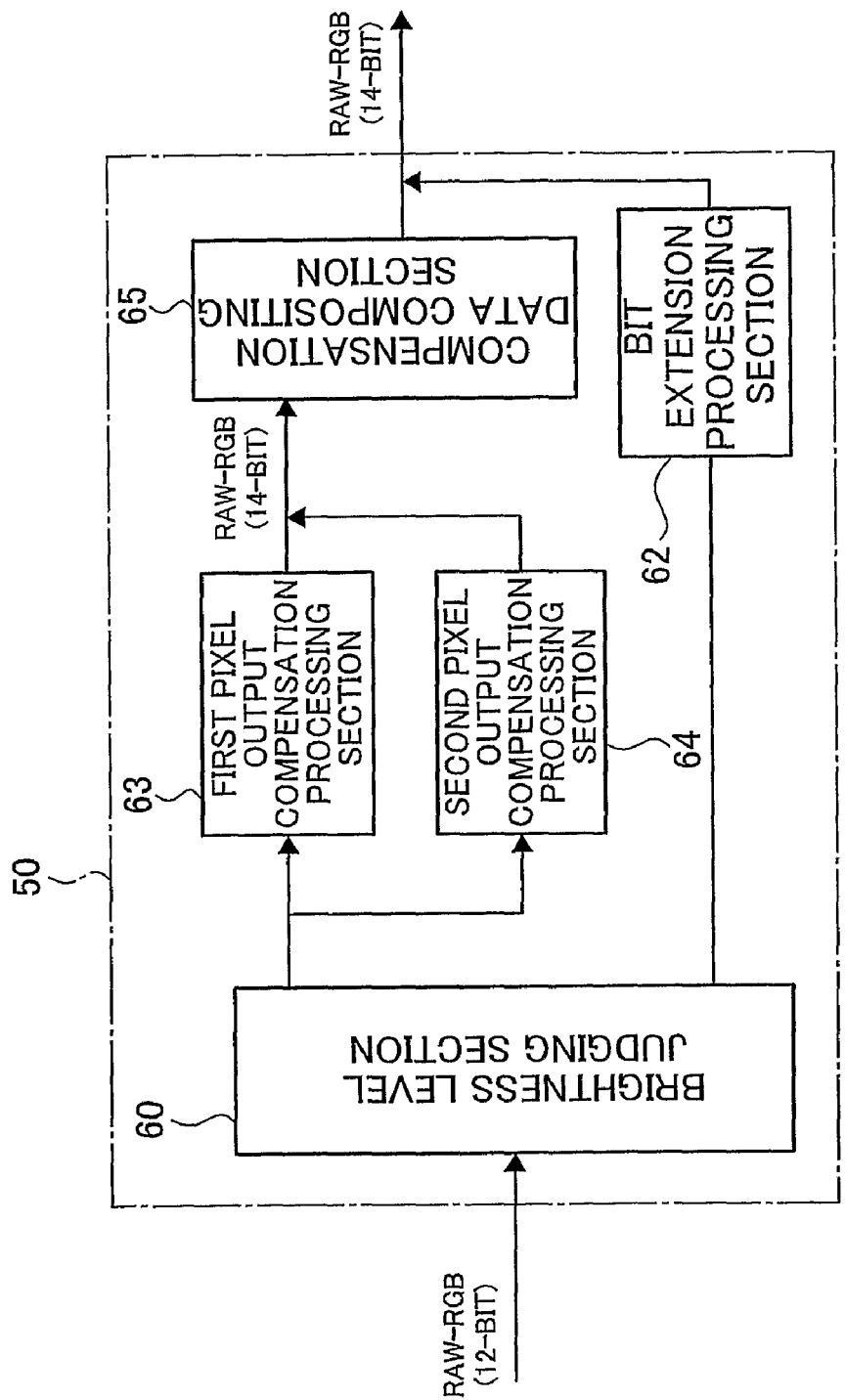
FIG. 20 is a block diagram of the dynamic range expansion compensating section in the digital camera according to an embodiment 5 of the present invention.

The dynamic range expansion compensating section 50 of the YUV converting section 36 of the present embodiment, as illustrated in FIG. 20, comprises a brightness level judging section 60, a bit extension processing section 62, a first pixel output compensation processing section 63, a second pixel output compensation processing section 64, and a compensation data compositing section 65. The brightness level judging section 60 and the bit extension processing section 62 are the same as those of the embodiment 1 as illustrated in FIG. 5. A structure of the digital camera 1, a monitoring process, a still image shooting process, and a dynamic range expanding process of the present embodiment are the same as those of the embodiment 1.

The first pixel output compensation processing section 63 (equivalent to the pixel output compensation processing section 61 of the embodiment 1 illustrated in FIG. 5), in a case where the pixel output of the G filter in the processing unit is judged to be equal to or more than the saturation level in the brightness level judging section 60, as well as the embodiment 1, compensates the pixel output of the G filter which is equal to or more than the saturation level based on the pixel output of the R and B filters in the processing unit.

The second pixel output compensation processing section 64 (equivalent to the pixel output compensation processing section 61a of the embodiment 4 illustrated in FIG. 18), in a case where the pixel output of the G filter in the processing unit is judged to be equal to or more than the saturation level in the brightness level judging section 60, as well as the embodiment 4, compensates the pixel output of the G filter which is equal to or more than the saturation level based on a distribution of values of pixel output of the other plurality of G filters in the processing unit.

The compensation data compositing section 65 performs an accurate compensating process based on the following conditions (first to fourth process conditions).

(First Process Condition)

In the first process condition, compensation values which are respectively outputted from the first and the second pixel output compensation processing sections 63 and 64 are averaged.

That is, in the compensation data compositing section 65, in a case where each compensation value for the pixel output of the G filter is inputted from the first and the second pixel output compensation processing sections 63 and 64, both compensation values are averaged, and based on the averaged compensation values, the pixel output of the G filter which is equal to or more than the saturation level is compensated.

(Second Process Condition)

In the second process condition, a compensation value outputted from the first pixel output compensation processing section 63 side has a priority to compensation values respectively outputted from the first and the second output compensation processing sections 63 and 64.

For example, considering a case where a main photographic subject is in a green background area and the pixel output of the G filter is equal to or more than the saturation level. In this case, the pixel output of the R and B filters is an extremely low value and a compensation value of the pixel output of the G filter by the first pixel output compensation processing section 63 often becomes lower than a pixel output of the G filter which is a compensation object.

In a case where the compensation data compositing section 65 compares a compensation value of the pixel output of the G filter which is equal to or more than the saturation level outputted from the first pixel output compensation processing section 63 to a value of the pixel output which is used for judging the saturation level in the brightness level judging section 60, and a compensation value outputted from the first pixel output compensation processing section 63 is higher than the value of the pixel output which is used for judging the saturation level in the brightness level judging section 60, the compensation value outputted from the first pixel output compensation processing section 63 is adopted as a final compensation value. On the other hand, in a case where the compensation value outputted from the first pixel output compensation processing section 63 is lower than the value of the pixel output which is used for judging the saturation level in the brightness level judging section 60, the compensation value outputted from the second pixel output compensation processing section 64 is adopted as a final compensation value.

(Third Process Condition)

In the third process condition, a compensation value outputted from the second pixel output compensation processing section 64 side has a priority to compensation values respectively outputted from the first and the second output compensation processing sections 63 and 64.

In a case where the pixel output of the G filter in the processing unit is equal to or more than the saturation level, a pixel output of the G filter in the vicinity may be close to reaching the saturation level. Therefore, as described above, the second pixel output compensation processing section 64, in a case where the pixel output of the G filter in the processing unit is judged to be equal to or more than the saturation level in the brightness judging section 60, compensates the pixel output of the G filter which is equal to or more than the saturation level from a distribution of values of the pixel output of the other plurality of G filters in the processing unit.

In this case, if the second pixel output compensation processing section 64 may not accurately compensate the pixel output of the G filter which is equal to or more than the saturation level from the distribution of the values of the pixel output of the other plurality of G filters in the processing unit, an output value from the second pixel output compensation processing section 64 is taken as "0" (zero).

And, in a case where the compensation data compositing section 65 compares a compensation value for the pixel output of the G filter which is equal to or more than the saturation level outputted from the second pixel output compensation processing section 64 to a value of the pixel output which is used for judging the saturation level in the brightness level judging section 60, and the compensation value outputted from the second pixel output compensation processing section 64 is lower than the value of the pixel output which is used for judging the saturation level in the brightness level judging section 60, the compensation value outputted from the first pixel output compensation processing section 63 is adopted as a final compensation value. On the other hand, in a case where the compensation value outputted from the second pixel output compensation processing section 64 is higher than the value of the pixel output which is used for judging the saturation level in the brightness level judging section 60, the compensation value outputted from the second pixel output compensation processing section 64 is adopted as a final compensation value.

(Fourth Process Condition)

In the fourth process condition, a process condition of the first to the third process conditions is accurately selected according to compensation values respectively outputted from the first and the second pixel output compensation processing sections 63 and 64.

That is, the compensation data compositing section 65, in a case where each compensation value of the pixel output of the G filter is equal to or more than the saturation level outputted from the first and the second pixel output compensation processing sections 63 and 64 is inputted, selects the first process condition and averages two compensation values, and the averaged compensation value is adopted as a final compensation value.

And, in a case where an output from the first pixel output compensation processing section 63 becomes a higher value than a value of a pixel output which is used for judging the saturation level in the brightness level judging section 60, the compensation data compositing section 65 selects the second process condition, and the compensation value outputted from the first pixel output compensation processing section 64 is adopted as a final compensation value. In a case where an output from the second pixel output compensation processing section 64 is a higher value than a value of a pixel output which is used for judging the saturation level in the brightness level judging section 60, the compensation data compositing section 65 selects the third process condition, and the compensation value outputted from the second pixel output compensation processing section 64 is adopted as a final compensation value.

Thus, the compensation data compositing section 65 accurately compensates a value of the pixel output of the G filter which is equal to or more than the saturation level according to the compensation value respectively outputted from the first and the second pixel output compensation processing sections 63 and 64, and thereby it is possible to perform an accurate dynamic range expansion compensating process.

[Embodiment 6]

In the digital camera 1 of the present embodiment, an accurate dynamic range expansion rate is automatically set by the controlling section 28 (see FIG. 2). Hereinafter, a dynamic range expansion rate setting process of the present embodiment will be explained.

Figure 21A:
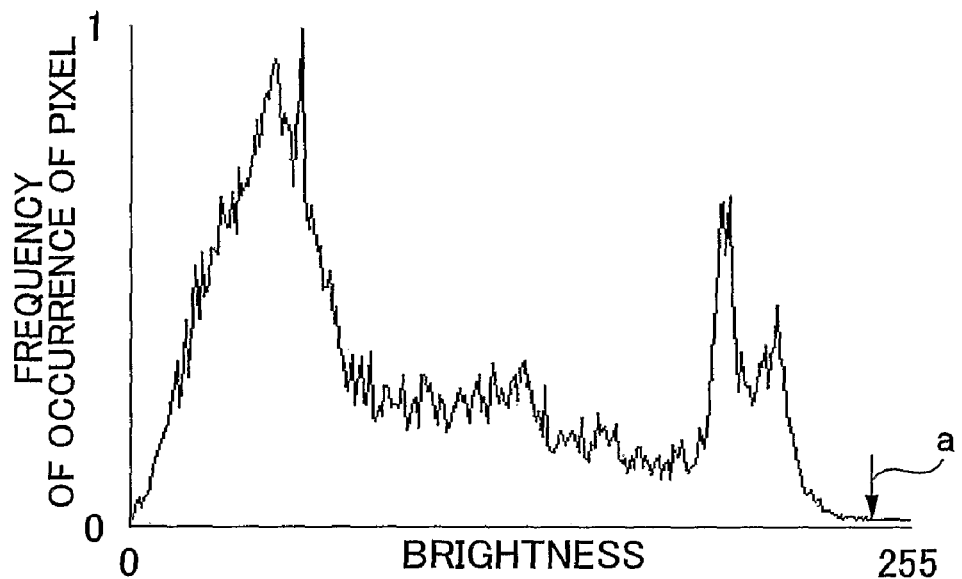
FIG. 21A is a histogram which illustrates a relationship between a frequency of a pixel occurrence and brightness in a case where the dynamic range is expanded by 200% in the digital camera according to an embodiment 6 of the present invention.

In the dynamic range expansion rate setting process of the present embodiment, firstly, as well as the embodiment 1 (or any one of the embodiments 2, 3, 4, and 5), the dynamic range expansion process is performed by setting the dynamic range expansion rate to be 200%. FIG. 21A is an example of a histogram which is produced in the brightness histogram producing section 57 (see FIG. 4), in a case where the dynamic range is expanded by 200% on a shooting image P in which the pixel output of the G filter is equal to or more than the saturation level. In FIG. 21A, a horizontal axis illustrates brightness (256 tones from 0 to 255 (8-bit)) and a vertical axis illustrates a frequency of a pixel occurrence (0 to 1 (=100%)).

The controlling section 28 (see FIG. 2) of the signal processing section 22 counts a frequency of a pixel occurrence from a maximum high brightness (255) side toward a low brightness side in the histogram (see FIG. 21A) which is produced in the brightness histogram producing section 57. And the controlling section 28 determines the dynamic expansion rate such that brightness where the counted frequency of the pixel occurrence in the vicinity of the maximum high brightness (255) becomes equal to or more than a prescribed value which is set beforehand becomes a new maximum value (maximum high brightness) after the dynamic range expansion.

That is, the frequency of the pixel occurrence from the maximum high brightness (255) side toward a low brightness side in the histogram of FIG. 21A which is produced is counted. The brightness which becomes the prescribed value in which the frequency of the pixel occurrence is set beforehand (for example, 0.01) is set to be the new maximum value of brightness after the dynamic range expansion. In the histogram of FIG. 21A, brightness indicated by an arrow "a" in the vicinity of the maximum high brightness (255) is brightness in which the frequency of the pixel occurrence becomes the prescribed value which is set beforehand.

And as well as the bit compression conversion characteristic illustrated in FIGS. 11 and 13, in a case where input 14-bit data is compressed into output 12-bit data, this prescribed value produces the bit compression conversion characteristic corresponding to the input 14-bit data in which the output 12-bit data becomes a maximum data (4095). Or, in a case where the formula (2), or the formula (3), and the bit compression conversion characteristic illustrated in FIG. 8 are used for the compressing process, the input 14-bit data is taken as the maximum value.

Figure 21B:
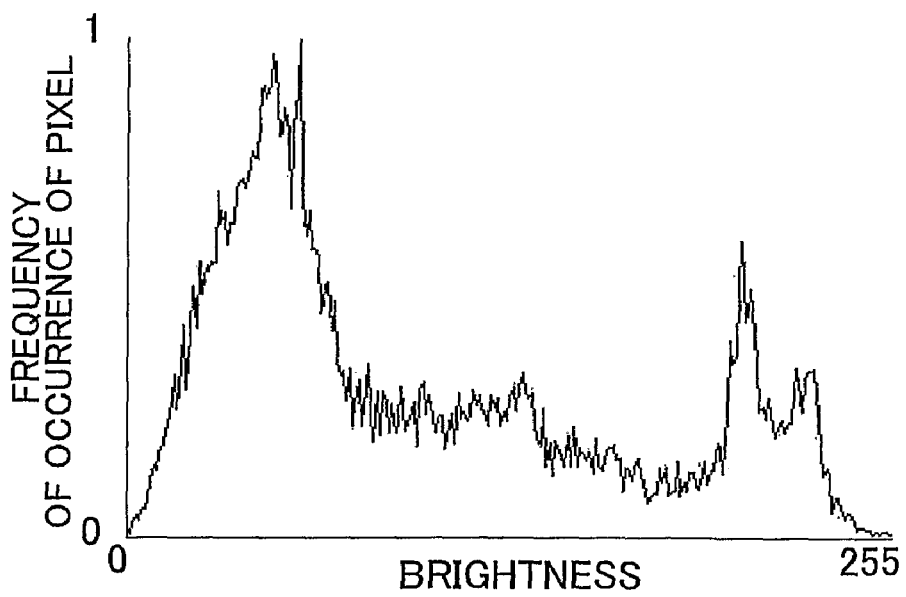
FIG. 21B is a histogram which illustrates a relationship between a frequency of a pixel occurrence and brightness in a case where the dynamic range is automatically set in the digital camera according to the embodiment 6 of the present invention.

An accurate dynamic range expansion rate can be automatically set to the controlling section 28 by performing the process like the above. Therefore, it is possible to effectively use the range of all tones which are representable by 8-bit RGB and to control an overexposure occurrence in the vicinity of the maximum high brightness (255) (see FIG. 21B).

In the present embodiment, the prescribed value is 0.01 as an example, however the prescribed value is not limited to this numeric value, but for example, may be taken as 0 (zero). In a case where the prescribed value is taken as 0 (zero), the maximum value of brightness is detected when the dynamic range expansion rate is 200%, and the detected value is taken as a final maximum value of brightness of the dynamic range (maximum high brightness (255)).

[Embodiment 7]

In the present embodiment of the digital camera 1, by the controlling section 28 (see FIG. 2), the dynamic range expansion rate is automatically set. Hereinafter, the dynamic range expansion rate setting process will be explained.

Figure 22A:
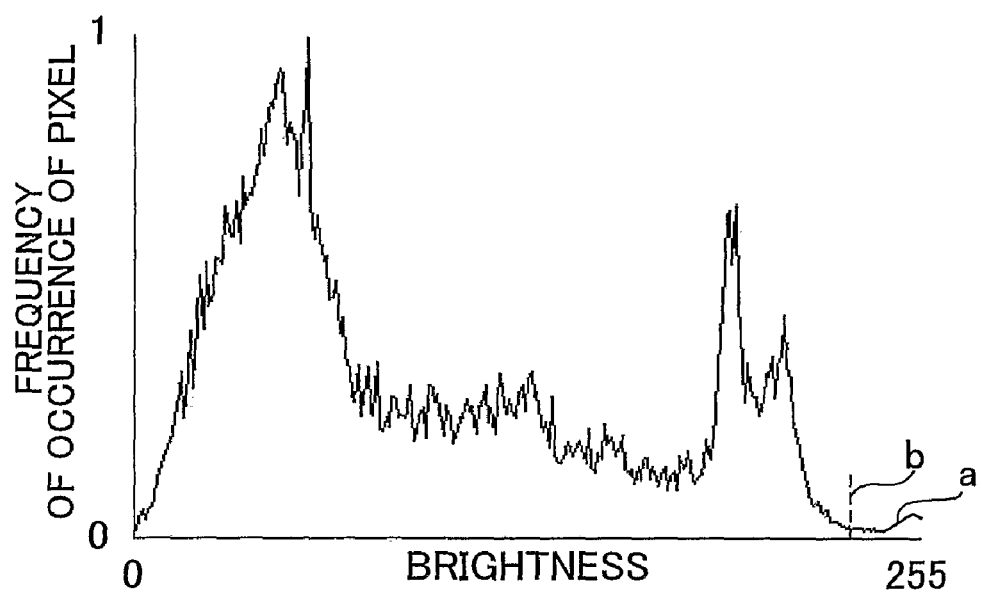
FIG. 22A is a histogram which illustrates a relationship between a frequency of a pixel occurrence and brightness in a case where the dynamic range is expanded by 200% in the digital camera according to an embodiment 7 of the present invention.

In the dynamic range expansion rate setting process of the present embodiment, firstly, as well as the embodiment 1 (or any one of the embodiment 2, 3, 4, and 5), the dynamic range expansion rate is set to be 200%, and the dynamic range expansion is performed. FIG. 22A is an example of a histogram which is produced in the brightness histogram producing section 57 (see FIG. 4), in a case where the dynamic range is expanded by 200% on a shooting image P in which the pixel output of the G filter is equal to or more than the saturation level (for example, there is a high-brightness luminous body in an extremely narrow area in the shooting image).

In this histogram, there is a pixel corresponding to the high-brightness luminous body in the vicinity of the maximum high brightness (255) (a place indicated by an arrow "a" in FIG. 22A). In FIG. 22A, a horizontal axis illustrates brightness (256 tones from 0 to 255 (8-bit)) and a vertical axis illustrates a frequency of a pixel occurrence (0 to 1 (=100%)).

The controlling section 28 (see FIG. 2) of the signal processing section 22 counts a frequency of a pixel occurrence from a lower brightness side toward a maximum high brightness (255) side in the histogram (see FIG. 22A) which is produced in the brightness histogram producing section 57.

And the controlling section 28 sets the dynamic range expansion rate such that brightness where, for example, approximately 98% of all counted values of the frequency of the pixel occurrence from low brightness to the maximum high brightness (255) occurs (a place indicated by an arrow "b" in FIG. 22A) becomes a new maximum value (maximum high brightness) after the dynamic range expansion.

And as well as the bit compression conversion characteristic illustrated in FIGS. 11 and 13, in a case where input 14-bit data is compressed into output 12-bit data, this new maximum value of brightness produces the bit compression conversion characteristic corresponding to the input 14-bit data in which the output 12-bit data becomes a maximum data (4095). Or, in a case where the formula (2), or the formula (3), and the bit compression conversion characteristic illustrated in FIG. 8 are used for the compressing process, the input 14-bit data is taken as the maximum value.

Figure 22B:
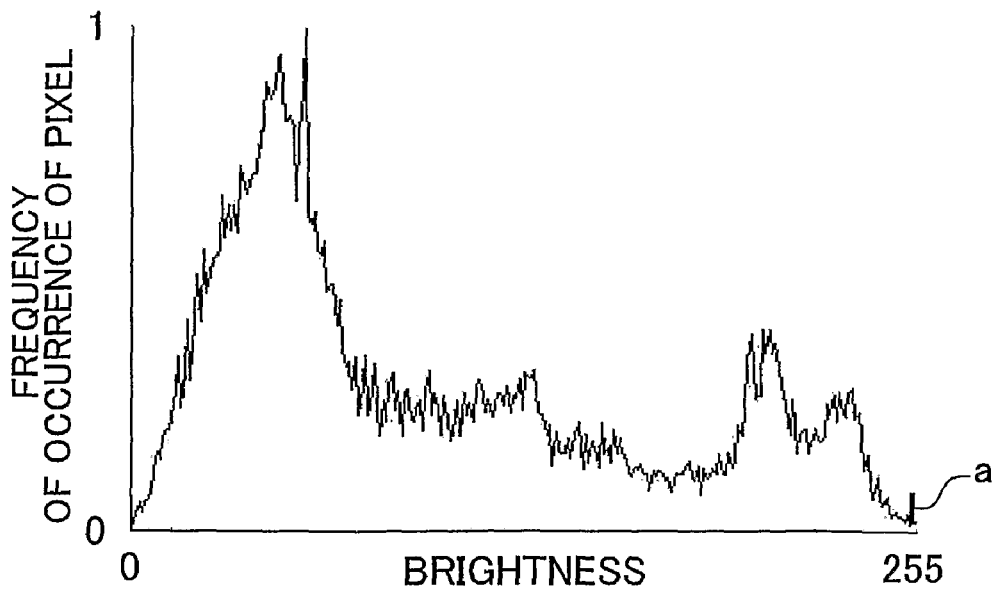
FIG. 22B is a histogram which illustrates a relationship between a frequency of a pixel occurrence and brightness in a case where the dynamic range is automatically set in the digital camera according to the embodiment 7 of the present invention.

By performing the process like the above, it is possible for the controlling section 28, in a case where there is a high-brightness luminous body in the extremely narrow area in the shooting image, to control its influence and to set automatically an accurate dynamic range such that a high brightness part which is not unnatural when it is saturated (a place indicated by an arrow "a" in FIG. 22B) is saturated. That is, it is possible to expand the dynamic range in the shooting image except a part where there is the high-brightness luminous body.

[Embodiment 8]

Figure 23:
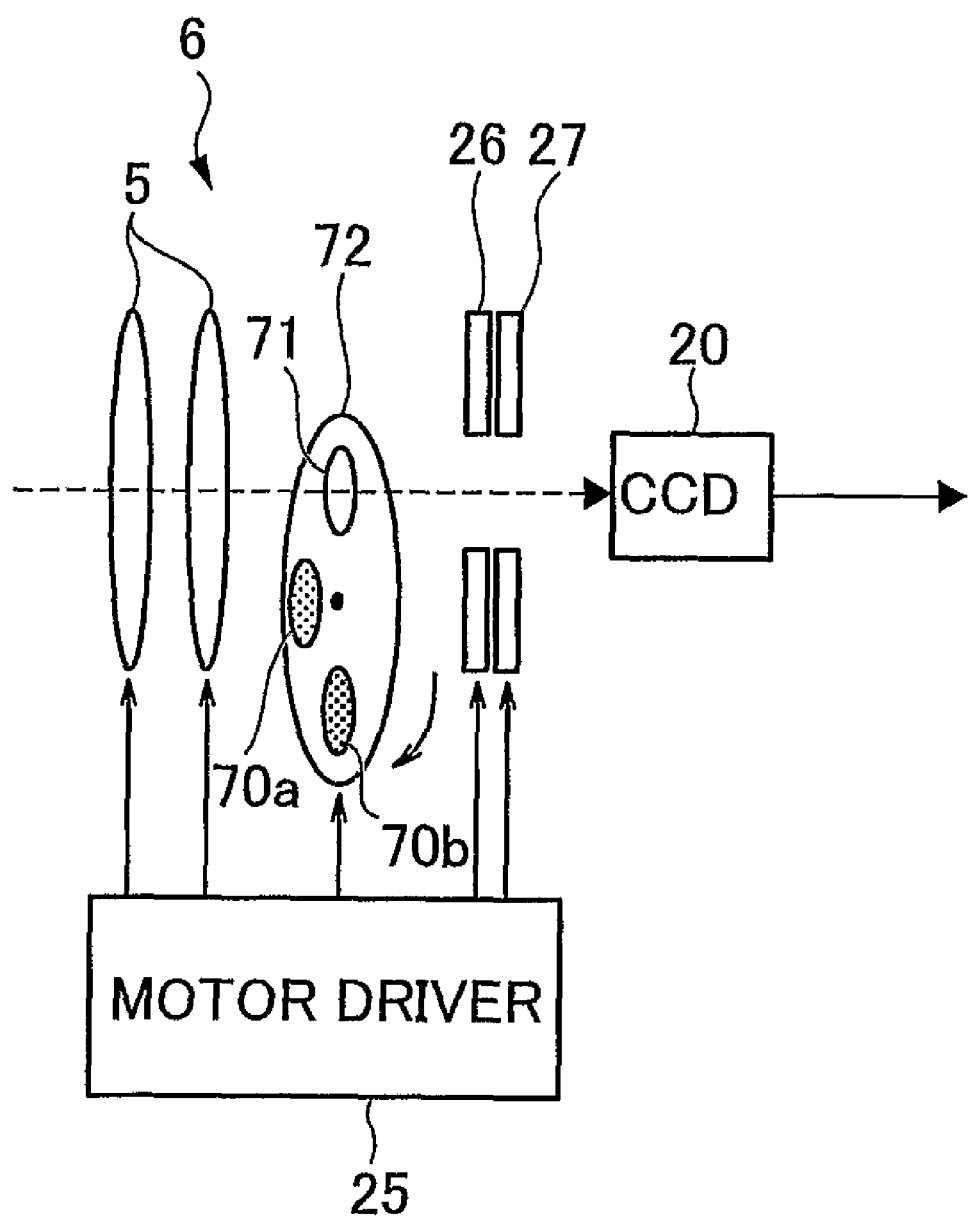
FIG. 23 is a structure diagram of a lens barrel in the digital camera according to an embodiment 8 of the present invention.

In the present invention, as illustrated in FIG. 23, between the photographing lens system 5 of the lens barrel unit 6 and the aperture unit 26, a turret plate 72, which is rotatable freely, and having a first green color filter 70a and a second green color filter 70b which have different transmission rates, and an opening part 71, is provided. The turret plate 72 is structured to rotate by the motor driver 25 which is driven by a signal from the controlling section 28, and to select any one of the first green color filter 70a, the second green color filter 70b and the opening part 71 and the selected one is placed on an optical axis of the photographing lens system 5. A structure of the digital camera 1, a monitoring process, a still image shooting process, and a dynamic range expanding process of this embodiment are the same as those of the embodiment 1. In a state where the opening part 71 of the turret plate 72 is placed on the optical axis of the photographing lens system 5, a structure of the present embodiment is the same as that of the embodiment 1.

Figure 24A:
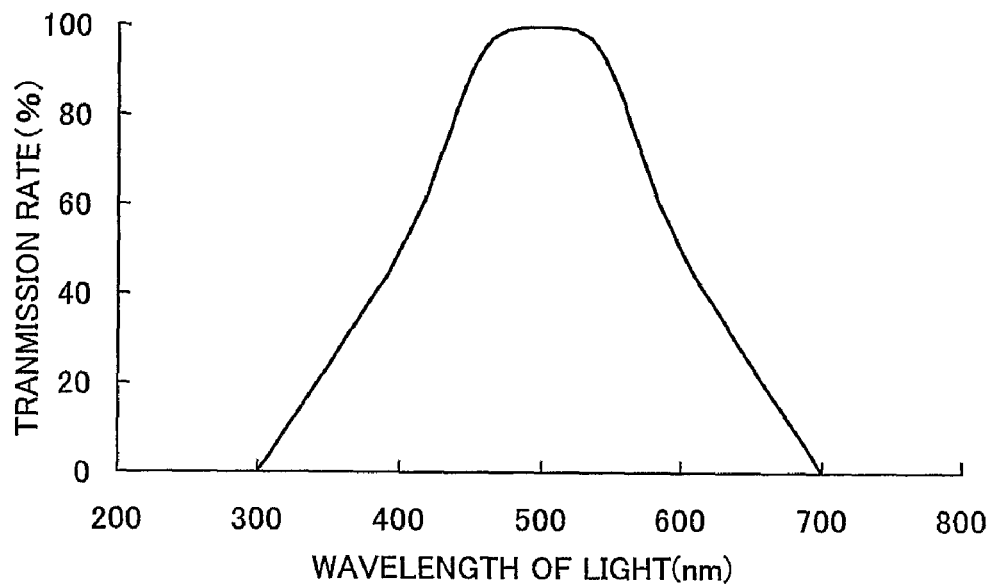
FIG. 24A is a view which illustrates a light transmission rate characteristic of a first green color filter to a wavelength of light in the digital camera according to an embodiment 8.
Figure 24B:
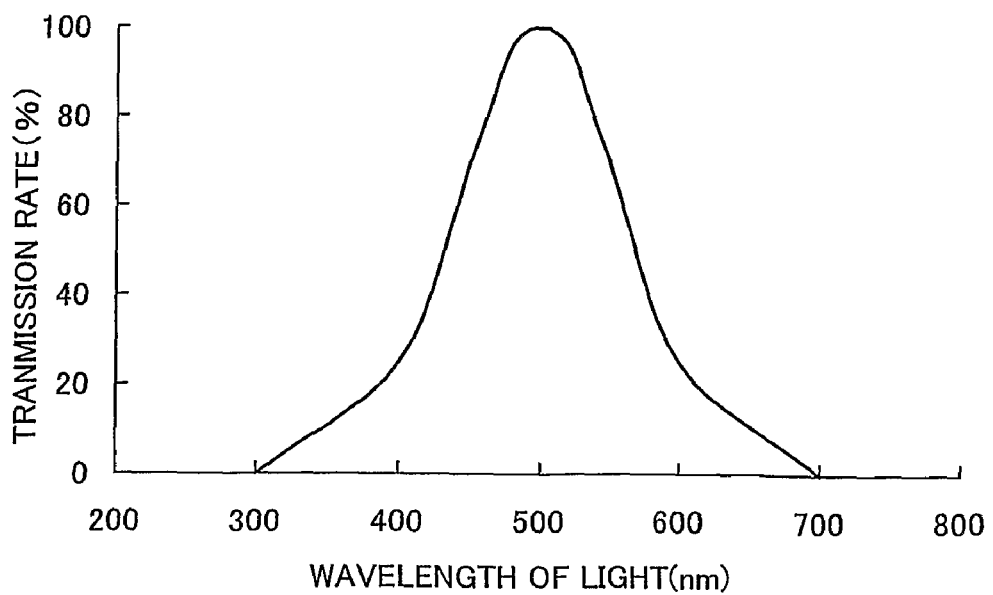
FIG. 24B is a view which illustrates a light transmission rate characteristic of a second green color filter to a wavelength of light in the digital camera according to the embodiment 8.

In a state where the first green color filter 70a or the second green color filter 70b of the turret plate 72 is placed on the optical axis of the photographing lens system 5, in the CCD 20 on which the RGB filter is placed, sensitivity of pixels on which the R and B filters are placed is largely reduced, however sensitivity of a pixel on which the G filter is placed is unchanged. FIG. 24A illustrates a light transmission rate characteristic to a wavelength of light of the first green color filter 70a, and FIG. 24B illustrates a light transmission rate characteristic to a wavelength of light of the second green color filter 70b. As illustrated in FIGS. 24A and 24B, a light transmission rate of the first green color filter 70a is approximately twice as better as the light transmission rate of the second green color filter 70b.

The first green color filter 70a has the light transmission rate such that the sensitivity of the pixel where the R and B filters are placed becomes approximately ½ of the usual sensitivity. As described above, the sensitivity of the pixel where the G filter is placed is twice as higher as the pixels where the R and B filters are placed. Therefore, in a state where the first green color filter 70a is placed on the optical axis of the photographing lens system 5, the sensitivity of the pixels where the R and B filters are placed relatively becomes approximately ¼ of the sensitivity of the pixel where the G filter is placed.

The second green color filter 70b has the light transmission rate such that the sensitivity of the pixel where the R and B filters are placed becomes approximately ¼ of the usual sensitivity. As described above, the sensitivity of the pixel where the G filter is placed is twice as higher as the pixels where the R and B filters are placed. Therefore, in a state where the second green color filter 70b is placed on the optical axis of the photographing lens system 5, the sensitivity of the pixels where the R and B filters are placed relatively becomes approximately ⅛ of the sensitivity of the pixel where the G filter is placed.

FIG. 25 illustrates each pixel output of the pixels where the RGB filter is placed, in a state where the first green color filter 70a is placed on the optical axis of the photographing lens system 5, and in "a", the pixel output of the pixel where a high-sensitivity G filter (the pixel output of the G filter) is placed is also in a state which is equal to or less than the saturation level A.

Also in the present embodiment, as "a", "b", "c", "d", and "e" in FIG. 25, the pixel output of the G filter is equal to or more than the saturation level A, however in a case where the pixel output (pixel output of the R and B filters) of pixels where the R and B filters are placed is equal to or less than the saturation level A, based on each pixel output of the R and B filters, each pixel sensitivity characteristic of the R and B filters ("g" in FIG. 25) and a pixel sensitivity characteristic of the G filter ("f" in FIG. 25), the pixel output of the G filter is compensated (dash-dotted line parts) and the dynamic range is expanded.

For example, in a case where there is an extremely bright part in a part of a background of a main photographic subject, by a judgment of a user, the user presses the menu (MENU) button 12 (see FIG. 1C) and selects an item of "400% dynamic range", and thereby a control signal is outputted from the controlling section 28 to the YUV converting section 36, and the dynamic range expansion process which is the same as the embodiment 1 is performed.

For example, in a case where the pixel output of the G filter in the processing unit (see FIG. 7) which is the same as the embodiment 1 is equal to or more than the saturation level, as described above, in the present embodiment, a sensitivity of a pixel where the G filter is placed is approximately 4 times as high as the pixels where the R and B filters are placed, and thereby a pixel output value of the G filter is calculated by a formula (5) below.

$$G=\{(R+B)/2\}\times 4 \qquad \text{formula (5)}$$

The pixel output compensation processing section 61 of the dynamic range expansion compensating section 50 illustrated in FIG. 5 sets the pixel output value of the G filter calculated by the formula (5) to be a pixel output value of the G filter in the processing unit. The pixel output value of the G filter becomes data which is beyond 12-bit data, therefore here the pixel output value of the G filter is once converted into 14-bit data. Both of the maximum values of the pixel output of the R and B filters are 4095 (12-bit), therefore a maximum value of the pixel output of the G filter becomes 16383 (14-bit), which is fourfold.

Other than the processing unit (see FIG. 7) of the embodiment 1, the processing unit may be each processing unit of the embodiments 2, 3, and 4 (see FIGS. 15, 16 and 17).

Figure 26:
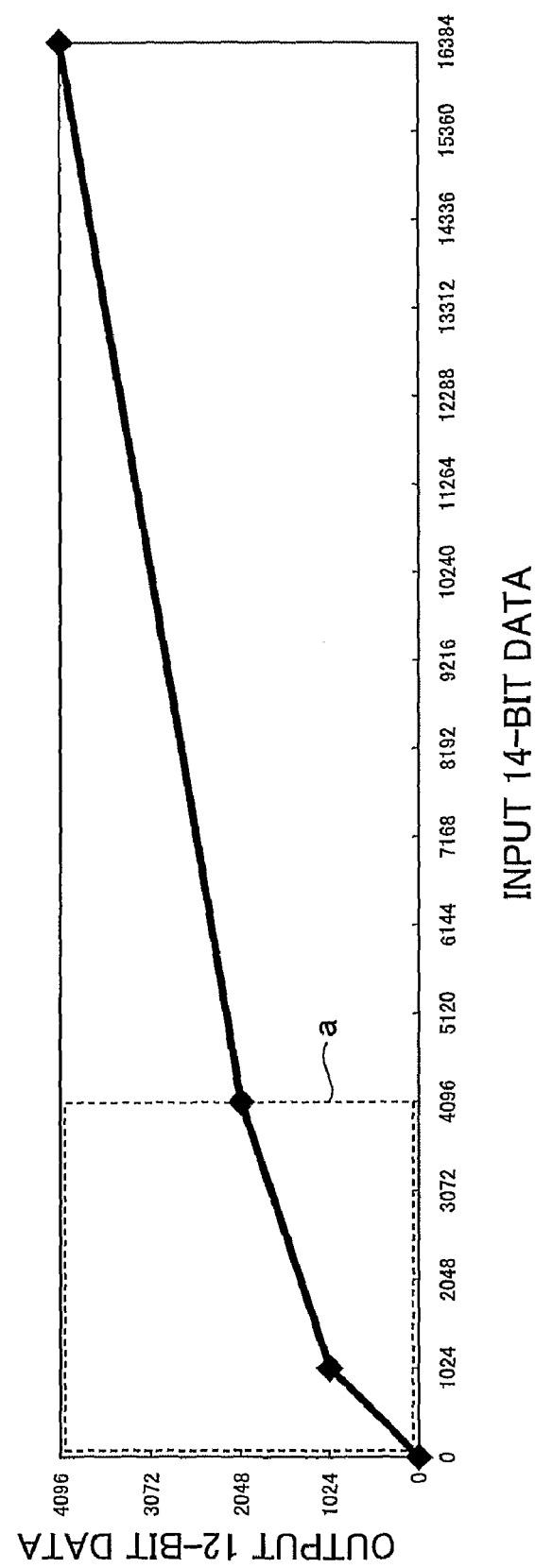
FIG. 26 illustrates a bit compression conversion characteristic of the pixel output in a case where the dynamic range is expanded by 400% in the digital camera according to the embodiment 1 of the present invention.

The bit compressing section 51 reduces 14-bit pixel output of the G filter into 12-bit by a bit compression conversion characteristic (conversion table) as illustrated in FIG. 26. In the bit compression conversion characteristic illustrated in FIG. 26, the maximum value of the pixel output of the G filter is 16383, therefore a compression is performed such that 16383 becomes 4095, which is the maximum value of output 12-bit data. And the pixel output of the R and B filters is also compressed in accordance with a compression rate of the pixel output of the G filter. Hereinafter, a process which is the same as the embodiment 1 is performed.

Also in the bit compression conversion characteristic of the present embodiment, a compression rate such that the pixel output before and after the bit compressing process in the bit compressing section 51 becomes approximately a same value is used for the pixel output in a low to middle brightness level which is equal to or less than the saturation level, and thereby a tone property in the low to middle brightness level can be favorably maintained.

Thus, in the present embodiment, even when shooting such that the pixel output of the G filter in the processing unit is equal to or more than the saturation level, by the first green color filter 70a which is placed on the optical axis of the photographing lens system 5, sensitivity of pixels where the R and B filters are placed can be relatively reduced to approximately ¼ of sensitivity of the pixel where the G filter is placed. Therefore, a compensation value of the pixel output of the G filter is expanded to dash-dotted line parts of "b", "c", "d" and "e" in FIG. 25, and the dynamic range can be expanded by 400%.

[Embodiment 9]

The embodiment 8 is structured such that the first green color filter 70a of the turret plate 72 is placed on the optical axis of the photographing lens system 5, and the dynamic range is expanded by 400%, however the present embodiment is an example in which the second green color filter 70b of the turret plate 72 illustrated in FIG. 23 is placed on the optical axis of the photographing lens system 5, and the dynamic range is expanded by 800%. A structure of the digital camera 1, a monitoring process, a still image shooting process, and a dynamic range expanding process of the present embodiment are the same as those of the embodiment 1.

As described above, in a state where the second green color filter 70b is placed on the optical axis of the photographing lens system 5, the sensitivity of the pixels of the R and B filters relatively becomes approximately ⅛ of the sensitivity of the pixel where the G filter is placed.

For example, in a case where there is an extremely bright part in a part of a background of a main photographic subject and so on, by a judgment of a user, the user presses the MENU (menu) button 12 (see FIG. 1C) and selects an item of "800% dynamic range", and thereby a control signal is outputted from the controlling section 28 to the YUV converting section 36, and the dynamic range expanding process which is the same as the embodiment 1 is performed.

And, for example, in a case where the pixel output of the G filter is equal to or more than the saturation level in the processing unit which is the same as the embodiment 1 (see FIG. 7), as described above, in the present embodiment, the sensitivity of the pixel where the G filter is placed is 8 times as high as the sensitivity of the pixels where the R and B filters are placed, therefore the pixel output value of the G filter is calculated by a formula (6) below. The processing unit may be, other than the processing unit in the embodiment 1 (see FIG. 7), each processing unit of the embodiments 2, 3, and 4 (see FIGS. 15, 16, and 17).

$$G=\{(R+B)/2\}\times 8 \quad \text{formula (6)}$$

And, the pixel output compensation processing unit 61 of the dynamic range expansion compensating section 50 illustrated in FIG. 5 sets a pixel output value of the G filter calculated by the formula (6) to be a pixel output value of the G filter in the processing unit. The pixel output value of the G filter is data which is beyond 12-bit, therefore here, the pixel output value of the G filter is once converted into 14-bit data. The bit compressing section 51 reduces 14-bit pixel output of the G filter into 12-bit. And the pixel output of the R and B filters is compressed in accordance with a compression rate of the pixel output of the G filter. Hereinafter, a process which is the same as the embodiment 1 is performed.

Thus, in the present embodiment, even when shooting such that the pixel output of the G filter in the processing unit is equal to or more than the saturation level, by the second green color filter 70b which is placed on the optical axis of the photographing lens system 5, sensitivity of pixels where the R and B filters are placed can be relatively reduced to approximately ⅛ of the sensitivity of the pixel where the G filter is placed. And thereby, a compensation value of the pixel output of the G filter is expanded to dash-dotted line parts of "b", "c", "d" and "e" in FIG. 25, and the dynamic range can be expanded by 800%.

In the embodiments 8 and 9, a structure is such that the turret plate 72, which is rotatable freely, and having the first green color filter 70a and the second green color filter 70b which have different light transmission rates and the opening section 71, is provided between the photographing lens system 5 of the lens barrel unit 6 and the aperture unit 26, however this turret plate 72 is provided at the other side of the aperture unit 26.

[Embodiment 10]

Figure 27A:
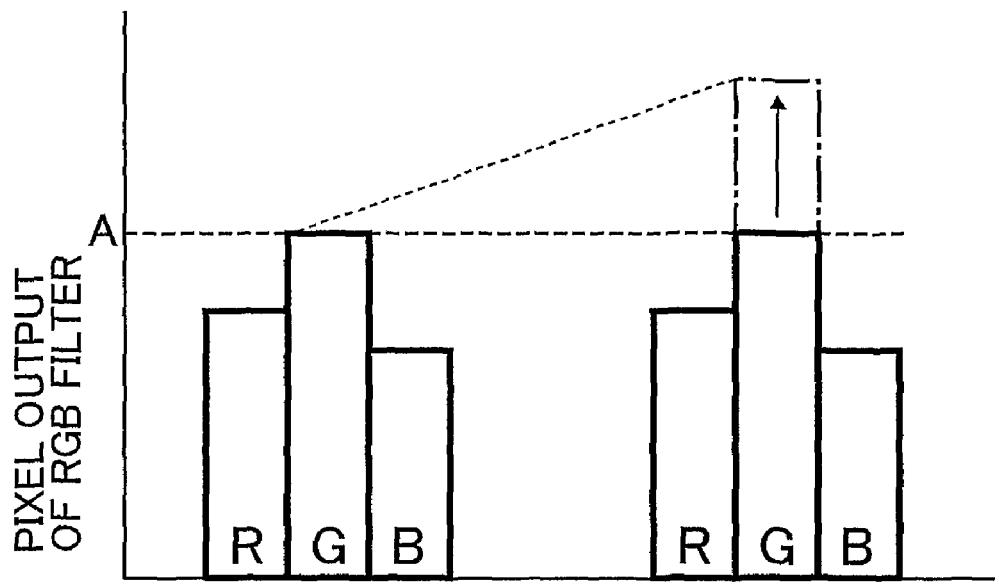
FIG. 27A illustrates a pixel output of the G filter after a compensation process, in a case where the pixel output of the G filter is equal to or more than a saturation level and the pixel output of the R and B filters in the vicinity of the G filter is close to the saturation level, in the digital camera according to an embodiment of the present invention.

In the present invention, as illustrated in FIG. 27A, in a case where the pixel output of the G filter in the processing unit described above (see FIG. 7) is equal to or more than the saturation level A, when the pixel output of the R and B filters in the vicinity is also somewhat high (however, less than the saturation level A), based on the formula (1) as described in the embodiment 1, the pixel output of the G filter is compensated so as to be expanded to equal to or more than the saturation level, and the dynamic range is expanded.

Figure 27B:
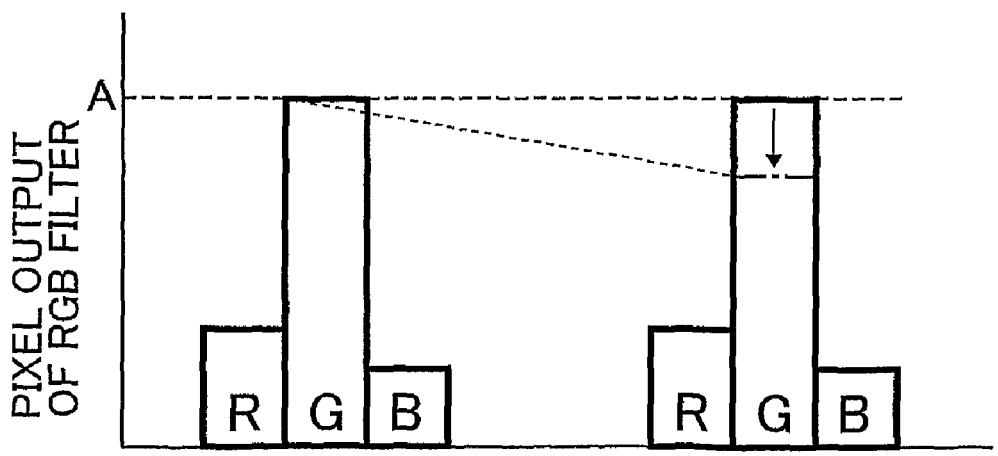
FIG. 27B illustrates a pixel output of the G filter after a compensation process, in a case where the pixel output of the G filter is equal to or more than a saturation level and the pixel output of the R and B filters in the vicinity of the G filter is extremely small, in the digital camera according to an embodiment of the present invention.

However, for example, as illustrated in FIG. 27B, in a case where the pixel output of the G filter is equal to or more than the saturation level A, there is a case where the pixel output of the R and B filters is extremely small compared to the pixel output of the G filter. In this case, if the pixel output of the G filter is compensated by the formula (1) of the embodiment 1, there may be a problem that the pixel output of the G filter is conversely reduced less than the saturation level A by an influence of the R and B filters in the vicinity where the pixel output is extremely small. Accordingly, in the present embodiment, in a case where the pixel output of the G filter which is equal to or more than the saturation level is calculated by the formula (1), by the pixel output compensation processing section 61 of the D range expansion compensating section 50 described in the embodiment 1 (see FIG. 5), only when a calculated result becomes bigger than a pixel output of the G filter which is a compensation object as illustrated in FIG. 27A is the pixel output of the G filter compensated so as to be expanded to equal to or more than the saturation level, and the dynamic range is expanded.

Therefore, in the present embodiment, in a case where the pixel output of the G filter which is equal to or more than the saturation level is calculated by the formula (1), when the calculated result becomes smaller than a pixel output of the G filter which is a compensation object as illustrated in FIG. 27B, a compensating process for the pixel output of the G filter is cancelled.

Thus, according to the present embodiment, even in a case where the pixel output of the G filter is equal to or more than the saturation level, when the pixel output of the R and B filters in the vicinity is extremely small compared to the pixel output of the G filter, the compensating process for the pixel output of the G filter is cancelled. Therefore, the pixel output of the G filter after compensating becomes equal to or less than the saturation level, and a problem of a color shift occurring can be prevented.

[Embodiment 11]

As described in the embodiment 10, in a case where the pixel output of the G filter in the processing unit (see FIG. 7) is equal to or more than the saturation level A, there is a case where the pixel output of the R and B filters in the vicinity is extremely small compared to the pixel output of the G filter. In this case, if the pixel output of the G filter is compensated by the formula (1) of the embodiment 1, there may be a problem that the pixel output of the G filter is conversely reduced to be less than the saturation level A by an influence of the R and B filters in the vicinity where the pixel output is extremely small (see FIG. 27B).

So, in the present embodiment, in a case where the pixel output of the G filter which is equal to or more than the saturation level is compensated, when the pixel output of the R and B filters in the vicinity is extremely small compared to the pixel output of the G filter, for example, as illustrated in FIG. 15 of the embodiment 2, the processing unit is enlarged compared with that in FIG. 7 of the embodiment 1. In this case, the pixel output of the G filter is compensated based on the formula (4) of the embodiment 2.

Thus, according to the present embodiment, in a case where the pixel output of the G filter is equal to or more than the saturation level, when the pixel output of the R and B filters in the vicinity is extremely small compared to the pixel output of the G filter, the processing unit when compensating is enlarged, and based on the pixel output of other R and B filters in the enlarged processing unit, the pixel output of the G filter is compensated so as to be expanded to equal to or more than the saturation level, and the dynamic range is expanded.

In addition, even in a case where the processing unit is enlarged as illustrated in FIG. 15, when the pixel output of the G filter after compensating is still reduced to be less than the saturation level, for example, as illustrated in FIG. 16 of the embodiment 3, the processing unit may be further enlarged. As illustrated in FIG. 16, in a case where the processing unit is further enlarged, it is possible to perform a more favorable compensating process by performing a compensating process such that the pixel output of the other G filter in which the pixel output is less than the saturation level is also used.

According to the present invention, in a case where a pixel output from a pixel where a color separation filter of a specific color is placed is equal to or more than a predetermined saturation level, based on a pixel output of another pixel placed in the vicinity of the pixel where the color separation filter of the specific color is placed in which a pixel output is less than a predetermined saturation level, a pixel output for brightness, where the pixel output becomes equal to or more than the saturation level, of the pixel, where the color separation filter of the specific color is placed and the pixel output is equal to or more than a predetermined saturation is compensated, and thereby the dynamic range of an image which is shot is expanded. Accordingly, compared with a known technique in which an image with an expanded dynamic range is obtained by compositing images obtained by a plurality of shootings with different exposure amounts, the present invention obtains the image with the expanded dynamic range at one shooting. In addition, it is possible to change an expansion rate of the dynamic range, therefore the dynamic range can be expanded properly corresponding to a photographic subject.

In addition, according to the present invention, in a case where a pixel output from a pixel where a color separation filter of a specific color is placed is equal to or more than a predetermined saturation level, based on a pixel output of a pixel where a different color separation filter from the specific color placed in the vicinity of the pixel where the color separation filter of the specific color is placed and the pixel output is less than a predetermined saturation level, a pixel output for brightness, where the pixel output becomes equal to or more than the saturation level, of the pixel where the color separation filter of the specific color is placed and the pixel output is equal to or more than a predetermined saturation is compensated, and thereby the dynamic range of an image which is shot is expanded. Accordingly, compared with a known technique in which an image with an expanded dynamic range is obtained by compositing images obtained by a plurality of shootings with different exposure amounts, the present invention obtains the image with the expanded dynamic range at one shooting. In addition, it is possible to change an expansion rate of the dynamic range, therefore the dynamic range can be expanded properly corresponding to a photographic subject.

Additionally, according to the present invention, in a case where a pixel output from a pixel where a color separation filter of a specific color is placed is equal to or more than a predetermined saturation level, based on a pixel output of a pixel where a same color separation filter as the specific color placed in the vicinity of the pixel where the color separation filter of the specific color is placed and the pixel output is less than a predetermined saturation level, a pixel output for brightness, where the pixel output becomes equal to or more than the saturation level, of the pixel where the color separation filter of the specific color is placed and the pixel output is equal to or more than a predetermined saturation is compensated, and thereby the dynamic range of an image which is shot is expanded. Accordingly, compared with a known technique in which an image with an expanded dynamic range is obtained by compositing images obtained by a plurality of shootings with different exposure amounts, the present invention obtains the image with the expanded dynamic range at one shooting. In addition, it is possible to change an expansion rate of the dynamic range, therefore the dynamic range can be expanded properly corresponding to a photographic subject.

Additionally, according to the present invention, in a case where a pixel output from a pixel where a color separation filter of a specific color is placed is equal to or more than a predetermined saturation level, based on a pixel output of a pixel where a different color separation filter from the specific color placed in the vicinity of the pixel where the color separation filter of the specific color is placed and the pixel output is less than a predetermined saturation level, a pixel output for brightness, where the pixel output becomes equal to or more than the saturation level, of the pixel where the color separation filter of the specific color is placed and the pixel output is equal to or more than a predetermined saturation is compensated, and based on a pixel output of a pixel where a same color separation filter as the specific color placed in the vicinity of the pixel where the color separation filter of the specific color is placed and the pixel output is less than a predetermined saturation level, a pixel output for brightness, where the pixel output becomes equal to or more than the saturation level, of the pixel where the color separation filter of the specific color is placed and the pixel output is equal to or more than a predetermined saturation is compensated, and a proper compensating process is performed based on both of these compensation values, and thereby the dynamic range of an image which is shot is expanded. Accordingly, compared with a known technique in which an image with an expanded dynamic range is obtained by compositing images obtained by a plurality of shootings with different exposure amounts, the present invention obtains the image with the expanded dynamic range at one shooting. In addition, it is possible to change an expansion rate of the dynamic range, therefore the dynamic range can be expanded properly corresponding to a photographic subject.

According to the present invention, a processing unit in a case where the pixel output is judged is an area which comprises two pixels in a horizontal direction and two pixels in a vertical direction respectively. Accordingly, based on the pixel output of the pixel which is adjacent, the dynamic range is expanded.

Additionally, according to the present invention, on an optical axis of an optical system, a same color filter as a specific color separation filter is placed, and thereby a sensitivity of another color separation filter is reduced relatively compared with the sensitivity of the specific color separation filter. Accordingly, the dynamic range of an image which is shot is expanded properly.

Additionally, according to the present invention, it is easily possible to change an expansion rate of the dynamic range since light transmission rates of a plurality of color filters are respectively different.

Additionally, according to the present invention, from a maximum high brightness side toward a low brightness side in a histogram which illustrates a relationship of a frequency of a pixel occurrence and brightness, the frequency of the pixel occurrence is integrated, and brightness where this integrated value becomes a prescribed value which is set beforehand changes and controls an expansion rate of the dynamic range to be a new maximum high brightness of the histogram. Therefore, it is possible to expand properly the dynamic range of the image which is shot according to the photographic subject.

Additionally, according to the present invention, from a maximum high brightness side toward a low brightness side in a histogram which illustrates a relationship a frequency of a pixel occurrence and brightness, the frequency of the pixel occurrence is integrated, and brightness where a proportion of an integrated value to a total number of frequencies of occurrences in a range of an entire brightness becomes a prescribed value which is set beforehand changes and controls an expansion rate of the dynamic range to be a new maximum high brightness of the histogram. Therefore, it is possible to expand properly the dynamic range of an image which is shot according to a photographic subject.

Additionally, according to the present invention, a dynamic range expansion rate is changed and controlled by multiplying a pixel output where the pixel output becomes less than a saturation level by a predetermined coefficient. Accordingly, it is possible to expand properly a dynamic range of an image which is shot.

Additionally, according to the present invention, based on a bit compression conversion characteristic in which a data compression rate of a pixel output for brightness where the pixel output becomes less than the saturation level is smaller than a data compression rate of a pixel output for brightness where the pixel output is equal to or more than the saturation level, the pixel output which is once extended with a dynamic range expansion is recompressed. Accordingly, more bit numbers are allocated in low to middle brightness levels in which a reliability of data is high, and a tone property of an image in low to middle brightness levels is favorably maintained.

Additionally, according to the present invention, in a case where brightness is less than the saturation level described above and is low-level, an expansion rate to make data of the pixel output before converting and data of the pixel output after converting become almost a same value is used, and thereby a tone property in a low brightness level can be favorably maintained.

Additionally, according to the present invention, compared with a pixel where a color separation filter of a specific color is placed and an output from the pixel where a pixel output is equal to or more than a predetermined saturation level, in a case where a pixel output where another color separation filter in the vicinity is placed is significantly small a problem that a pixel output after a compensating process of the pixel where the color separation filter of the specific color is placed and the pixel output is equal to or more than the predetermined saturation level becomes smaller than a pixel output of a pixel which is a compensation object can be avoided.

Additionally, according to the present invention, compared with a pixel where a color separation filter of a specific color is placed and an output from the pixel where a pixel output is equal to or more than a predetermined saturation level, in a case where a pixel output where another color separation filter in the vicinity is placed is significantly small a pixel output from a pixel which is at a further external side of the vicinity is used for a compensating process, and thereby a problem that a pixel output after the compensating process of the pixel where the color separation filter of the specific color is placed and the pixel output is equal to or more than the predetermined saturation level becomes smaller than a pixel output of a pixel which is a compensation object can be avoided.

Furthermore, according to the present invention, a compensating process is performed also by use of a pixel output of a pixel where a color separation filter of a specific color is placed and a pixel output is less than a saturation level, and thereby it is possible to perform a more favorable compensating process.

In addition, in each embodiment described above, the structure has an RGB 3 primary-color filter as a color separation filter, however even in a structure which has a complementary color system filter as the color separation filter, the present invention can be applied as well.

Although the present invention has been described in terms of exemplary embodiments, it is not limited hereto. It should be appreciated that variations may be made in the embodiments described by persons skilled in the art without departing from the scope of the present invention defined by the following claims.

As a color separation filter, the present invention can be applied to an imaging apparatus in which an RGB three-primary-color system filter, or a complementary color system filter is placed.

The present application is based on and claims priority from Japanese patent application numbers 2007-240038, filed Sep. 14, 2007, 2007-288714, filed Nov. 6, 2007, and 2008-165908, filed Jun. 25, 2008, the disclosures of which are hereby incorporated by reference herein their entireties.

The invention claimed is:

1. An imaging apparatus comprising:
an image sensor having a light receiving surface including a plurality of pixels and a color separation filter of a plurality of colors which is placed on a front surface side of the plurality of pixels, which receives a photographic subject image which enters via an optical system on the light receiving surface via the color separation filter, outputs an pixel output of each pixel, and images the photographic subject image;
a pixel output judging section which judges if the pixel output is equal to or more than a predetermined saturation level or not;
a pixel output compensation processing section which, in a case where the pixel output of the pixel where a color separation filter of a specific color is placed is judged to be equal to or more than the predetermined saturation level by the pixel output judging section, based on the pixel output of other pixels where the pixel output is less than the predetermined saturation level placed in the vicinity of the pixel where the color separation filter of the specific color is placed and the pixel output is equal to or more than the predetermined saturation level, performs a compensation process to calculate the pixel output for brightness, where the pixel output becomes equal to or more than the predetermined saturation level, of the pixel where the color separation filter of the specific color is placed and the pixel output is equal to or more than the predetermined saturation level, and expands a dynamic range of the image which the image sensor images; and
a bit compression converting section having a bit compression conversion characteristic where a data compression rate of the pixel output for brightness which is less than the saturation level is smaller than a data compression rate of the pixel output for brightness which is equal to or more than the saturation level, with the dynamic range expansion, and which reconverts data of the pixel output converted from a first bit number to a second bit number which is larger than the first bit number to the first bit number based on the bit compression conversion characteristic.

2. The imaging apparatus according to claim 1, wherein the pixel output compensation processing section, in a case where the pixel output of the pixel where a color separation filter of a specific color is placed is judged to be equal to or more than the predetermined saturation level by the pixel output judging section, based on a pixel output of a pixel where a different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

3. The imaging apparatus according to claim 1, wherein the pixel output compensation processing section, in a case where the pixel output of the pixel where the color separation filter of the specific color is placed is judged to be equal to or more than the predetermined saturation level by the pixel output judging section, based on the pixel output of the pixel where a same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

4. The imaging apparatus according to claim 1, wherein the pixel output compensation processing section comprises: a first pixel output compensation processing section which, in a case where the pixel output of the pixel where the color separation filter of the specific color is placed is judged to be equal to or more than the predetermined saturation level by the pixel output judging section, based on the pixel output of the pixel where the different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level; and a second pixel output compensation processing section which, in a case where the pixel output of the pixel where the color separation filter of the specific color is placed is judged to be equal to or more than the predetermined saturation level by the pixel output judging section, based on the pixel output of the pixel where the same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and the pixel output compensation processing section, based on compensation values which are outputted respectively from the first pixel output compensation processing section and the second pixel output compensation processing section, properly sets the pixel output for brightness which is equal to or more than the saturation level of the pixel where the color separation filter of the specific color is placed and the pixel output is equal to or more than the predetermined saturation level, and expands the dynamic range of the image which the image sensor images.

5. The imaging apparatus according to claim 1, wherein a processing unit, in the case of judging the pixel output by the pixel output judging section, is an area comprising two pixels each in a horizontal and a vertical direction.

6. The imaging apparatus according to claim 1, wherein on an optical axis of the optical system, a color filter having a same color as the color separation filter of the specific color is provided as it is placed freely, and the color filter is placed on the optical axis of the optical system, and thereby a sensitivity of another color separation filter is relatively reduced, compared with a sensitivity of the color separation filter, of the specific color.

7. The imaging apparatus according to claim 1, wherein a plurality of the color filters is provided and each of the color filters has a different light transmission rate.

8. The imaging apparatus according to claim 1, further comprising: a dynamic range expansion rate setting section which sets the dynamic range expansion rate; an expansion rate changing and controlling section which changes and controls the dynamic range expansion rate in the pixel output compensation processing section, based on the dynamic range expansion rate set by the dynamic range expansion rate setting section; and a histogram producing section which produces a histogram by calculating a frequency of an occurrence of the pixel output at each brightness in a predetermined brightness range, and the expansion rate changing and controlling section, in a case where the pixel output of the pixel where a color separation filter of a specific color is placed is judged to be equal to or more than the predetermined saturation level by the pixel output judging section, integrates the frequency of the occurrence of the pixel, from a maximum high brightness side toward a low brightness side in the histogram which is produced in the histogram producing section, and changes and controls the dynamic range expansion rate such that brightness where the integrated value becomes a prescribed value which is set beforehand becomes a new maximum high brightness of the histogram.

9. The imaging apparatus according to claim 1, further comprising: a dynamic range expansion rate setting section which sets the dynamic range expansion rate; an expansion rate changing and controlling section which changes and controls the dynamic range expansion rate in the pixel output compensation processing section, based on the dynamic range expansion rate set by the dynamic range expansion rate setting section; and a histogram producing section which produces a histogram by calculating a frequency of an occurrence of the pixel output at each brightness in a predetermined brightness range, and the expansion rate changing and controlling section, in a case where the pixel output of the pixel where a color separation filter of a specific color is placed is judged to be equal to or more than the predetermined saturation level by the pixel output judging section, integrates the frequency of the occurrence of the pixel, from a low brightness side toward a maximum high brightness side in the histogram which is produced in the histogram producing section, and changes and controls the dynamic range expansion rate such that brightness where the integrated value becomes a prescribed value which is set beforehand becomes a new maximum high brightness of the histogram.

10. The imaging apparatus according to claim 1, further comprising: a dynamic range expansion rate setting section which sets the dynamic range expansion rate; and an expansion rate changing and controlling section which changes and controls the dynamic range expansion rate in the pixel output compensation processing section, based on the dynamic range expansion rate set by the dynamic range expansion rate setting section, and the expansion rate changing and controlling section, with the dynamic range expansion, changes and controls the dynamic range expansion rate by multiplying the pixel output which is less than the predetermined saturation level by a predetermined coefficient.

11. The imaging apparatus according to claim 1, wherein the bit compression conversion characteristic, in a case where the brightness is less than the predetermined saturation level and low-level, has a compression rate such that data of the pixel output before converting and data of the pixel output after converting become almost a same value.

12. The imaging apparatus according to claim 1, wherein the pixel output compensation processing section, only in a case where the pixel output which is calculated when performing the compensation process becomes larger than a pixel output being a compensation process object, performs the compensation process.

13. The imaging apparatus according to claim 1, wherein the pixel output compensation processing section, in a case where the pixel output which is calculated when performing the compensation process becomes smaller than a pixel output being a compensation process object, expands a distribution range of the pixel which is used for a calculation of the pixel output described above.

14. The imaging apparatus according to claim 13, wherein the pixel output compensation processing section, in the case of expanding the distribution range of the pixel, also uses the pixel where the color separation filter of the specific color is placed and the pixel output is less than the saturation level.

15. An imaging method of an imaging apparatus having an image sensor having a light receiving surface including a plurality of pixels and a color separation filter of a plurality of colors which is placed on a front surface side of the plurality of pixels, which receives a photographic subject image which enters via an optical system on the light receiving surface via the color separation filter, outputs a pixel output of each pixel, and images the photographic subject image, the imaging method comprising:
 a pixel output judging step of judging if the pixel output is equal to or more than a predetermined saturation level or not;
 a pixel output compensation processing step of, in a case where the pixel output of the pixel where a color separation filter of a specific color is placed is judged to be equal to or more than the predetermined saturation level by the pixel output judging step, based on the pixel output of other pixels where the pixel output is less than the predetermined saturation level placed in the vicinity of the pixel where the color separation filter of the specific color is placed and the pixel output is equal to or more than the predetermined saturation level, performing a compensation process to calculate the pixel output for brightness, where the pixel output becomes equal to or more than the predetermined saturation level, of the pixel where the color separation filter of the specific color is placed and the pixel output is equal to or more than the predetermined saturation level, and expanding a dynamic range of the image which the image sensor images; and
 providing a bit compression converting section having a bit compression conversion characteristic where a data compression rate of the pixel output for brightness which is less than the saturation level is smaller than a data compression rate of the pixel output for brightness which is equal to or more than the saturation level, with the dynamic range expansion, and causing the bit compression converting section to reconvert data of the pixel output converted from a first bit number to a second bit number which is larger than the first bit number to the first bit number based on the bit compression conversion characteristic.

16. The imaging method according to claim 15, wherein the pixel output compensation processing step, in a case where the pixel output of the pixel where a color separation filter of a specific color is placed is judged to be equal to or more than the predetermined saturation level by the pixel output judging step, based on a pixel output of a pixel where a different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

17. The imaging method according to claim 15, wherein the pixel output compensation processing step, in a case where the pixel output of the pixel where a color separation filter of a specific color is placed is judged to be equal to or more than the predetermined saturation level by the pixel output judging step, based on the pixel output of the pixel where a same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performs the compensation process to calculate the pixel output for brightness, where the pixel output becomes equal to or more than the predetermined saturation level, of the pixel where the color separation filter of the specific color is placed and the pixel output is equal to or more than the predetermined saturation level, and expands the dynamic range of the image which the image sensor images.

18. The imaging method according to claim 15, wherein the pixel output compensation processing step comprises: a first pixel output compensation processing step of, in a case where the pixel output of the pixel where a color separation filter of a specific color is placed is judged to be equal to or more than the predetermined saturation level by the pixel output judging step, based on the pixel output of the pixel where the different color separation filter from the color separation filter of the specific color is placed and the pixel output is less than the predetermined saturation level placed in the vicinity of the pixel where the color separation filter of the specific color is placed and the pixel output is equal to or more than the predetermined saturation level, performing the compensation process to calculate the pixel output for brightness, where the pixel output becomes equal to or more than the predetermined saturation level, of the pixel where the color separation filter of the specific color is placed and the pixel output is equal to or more than the predetermined saturation level; and a second pixel output compensation processing step of, in a case where the pixel output of the pixel where a color separation filter of a specific color is placed is judged to be equal to or more than the predetermined saturation level by the pixel output judging step, based on the pixel output of the pixel where the same color separation filter as the color separation filter of the specific color is placed and the pixel output is less than the predetermined saturation level placed in the vicinity of the pixel where the color separation filter of the specific color is placed and the pixel output is equal to or more than the predetermined saturation level, performing the compensation process to calculate the pixel output for brightness, where the pixel output becomes equal to or more than the predetermined saturation level, of the pixel where the color separation filter of the specific color is placed and the pixel output is equal to or more than the predetermined saturation level, and the pixel output compensation processing step, based on compensation values which are outputted respectively from the first pixel output compensation processing step and the second pixel output compensation processing step, properly sets the pixel output for brightness which is equal to or more than the saturation level of the pixel where the color separation filter of the specific color is placed and the pixel output is equal to or more than the predetermined saturation level, and expands the dynamic range of the image which the image sensor images.

19. The imaging method according to claim 15, wherein a processing unit, in the case of judging the pixel output by the pixel output judging step, is an area comprising two pixels each in a horizontal and a vertical direction.

* * * * *